Feb. 22, 1955

H. M. DUSTIN 2,702,668

DECIMAL ALIGNING MECHANISM

Filed March 7, 1952

9 Sheets-Sheet 1

INVENTOR

Howard M. Dustin

Feb. 22, 1955 H. M. DUSTIN 2,702,668

DECIMAL ALIGNING MECHANISM

Filed March 7, 1952 9 Sheets-Sheet 2

INVENTOR

Howard M. Dustin

INVENTOR
Howard M. Dustin

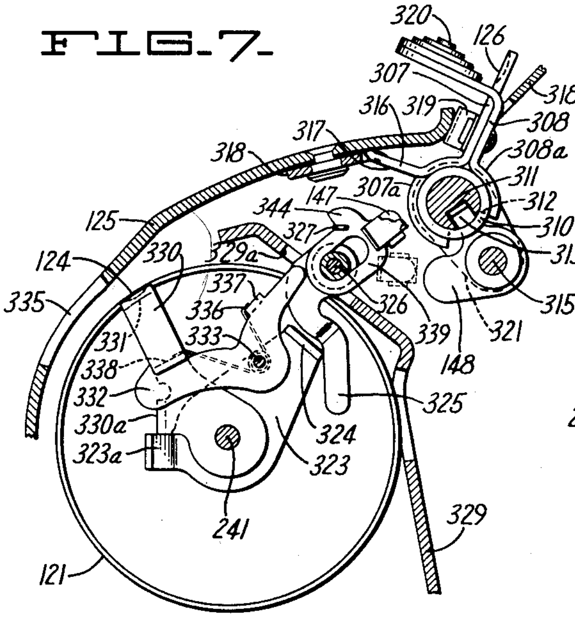
FIG. 7
FIG. 8
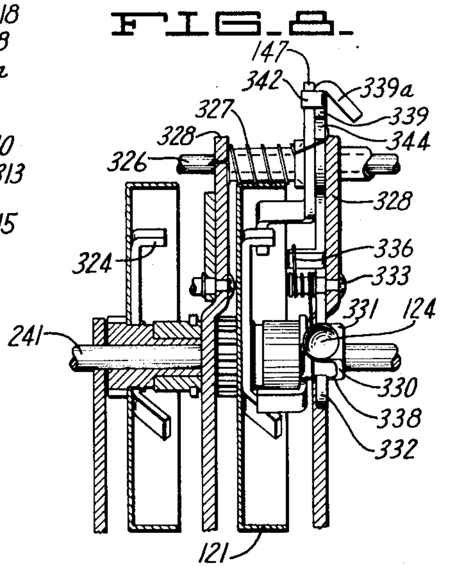
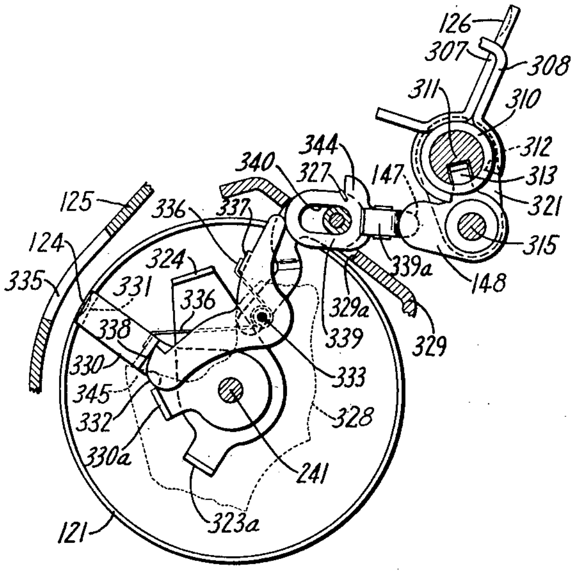
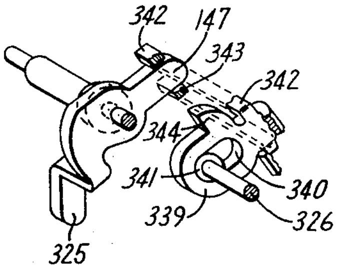
FIG. 10
FIG. 9
INVENTOR
Howard M. Dustin

INVENTOR

Howard M. Dustin

INVENTOR
Howard M. Dustin

Feb. 22, 1955 H. M. DUSTIN 2,702,668

DECIMAL ALIGNING MECHANISM

Filed March 7, 1952 9 Sheets-Sheet 7

INVENTOR

Howard M. Dustin

Feb. 22, 1955 H. M. DUSTIN 2,702,668

DECIMAL ALIGNING MECHANISM

Filed March 7, 1952 9 Sheets-Sheet 8

INVENTOR

Howard M. Dustin

Feb. 22, 1955 H. M. DUSTIN 2,702,668

DECIMAL ALIGNING MECHANISM

Filed March 7, 1952 9 Sheets-Sheet 9

INVENTOR

Howard M. Dustin.

2,702,668

DECIMAL ALIGNING MECHANISM

Howard M. Dustin, Oakland, Calif., assignor to Marchant Calculators, Inc., a corporation of California Application March 7, 1952, Serial No. 275,259

11 Claims. (Cl. 235—79)

The present invention relates to calculating machines and particularly concerns decimal entry and shift control mechanisms for calculating machines having a ten key keyboard and differential actuators that are mounted in a shiftable carriage.

A machine of this general type is shown in U. S. Patent No. 2,108,596 dated February 15, 1938, in which the numeral keys control entry of digital values of a factor in successive orders of the actuator by means of a single order numeral entry device that is fixed laterally in the machine and controlled by the keyboard to adjust each order of the actuator successively. The depression of a numeral key for so doing escapes the actuator carriage for a one step shifting movement toward the left to bring an adjacent order of the actuator into alignment with the entry device preparatory to entry of the next digit. During this shifting movement, the actuator moves relative to a stationary accumulator register; therefore, after entry of a given number of factor digits, the carriage is of necessity, in operative relation to a given group of orders of the register. If the decimal point in the register has been established a given number of places to the left of the lowest order thereof and if the number of decimal places in the factor is not equal to the number of decimal orders in the register, then zeros must be "pumped in" the actuator in order to bring the factor in the actuator into proper decimal alignment with the established result decimal point position.

The machine of the present invention, on the other hand, is equipped with a decimal point key adjacent the ten key keyboard, whereby a selected numeral and decimal value of a factor is entered into the machine by depressing the numeral keys and the decimal key in the sequence that the digits and the decimal point appear on paper. A carriage shift control mechanism is effective during such entry to automatically bring the factor into proper decimal alignment with a previously established result decimal point position without the necessity of "pumping in" zeros.

This is accomplished by maintaining the actuator carriage in the extreme left end position during the entry of the factor digits before the decimal point. A shiftable single order entry device is initially in alignment with the leftmost or highest order of the actuator, and depression of a numeral key controls the setting of that order and then causes a one step rightward shift of the entry device into alignment with the next lower order of the actuator. The actuator remains stationary during the step by step shifting movement of the entry device and the consequent setting of each successively lower actuator order until the decimal point key is depressed.

Depression of the decimal point key releases the actuator carriage for shifting movement toward the right, which movement is arrested by a factor and result decimal means, described in detail hereinafter, to thereby bring the factor decimal point into alignment with the previously established position of the result decimal. During the shifting movement of the carriage the entry device is carried with it, and after the actuator carriage is brought into proper decimal alignment, the depression of the numeral keys cause entry of the digits after the decimal point in the factor and control the step by step movement of the entry device incident to the entry of each successive digit. The digit before and after the factor decimal point having thus been entered into the actuator, and the carriage brought to its proper position relative to the result register and its decimal point, the subsequent operation of the machine causes registration of the factor digits in the result register in correct relation to the result decimal point regardless of the variation of the number of digits before or after the decimal point in the factors.

The registration is followed by an automatic return of the carriage and the entry device to their respective left end positions and then the actuators and the factor decimal point are normalized preparatory to the entry of the next factor.

The decimal and shift control mechanism of the present invention is disclosed as embodied in the machine that is driven by a handcrank and therefore motor power is not available for return of the carriage to its initial position against the spring that shifted it to its decimal aligning position. It is, therefore, another feature of the invention to provide two opposed springs, one for shifting the carriage toward the right and the other for shifting the carriage toward the left, together with spring latching, releasing and recocking means whereby a latch, in one instance, releases the stronger of the two springs and causes shifting of the carriage in one direction against the weaker spring, with means for recocking the stronger spring, and another latch that releases the carriage for return movement under the stress of the weaker spring, all as described in detail hereinafter.

The present invention is therefore based upon the principle of maintaining a shiftable actuator carriage in a normal position during entry of the digits occurring before the decimal point of a factor and releasing said carriage for movement to a position in which the decimal point of the factor is aligned with a result decimal.

On the basis of this principle, it is a primary object of the invention to shift a numeral wheel actuator to a position in which the decimal point of the factor entered into said actuator is aligned with a selectively positioned decimal point of an accumulator or result register.

It is a further object to employ a decimal point key for attainment of the primary object of the invention.

It is a further object to establish a visual indication of a factor decimal point mounted in a shiftable actuator carriage by depression of a decimal point key.

It is a further and more specific object to shift a single order value entry device with a transversely shiftable actuator carriage during a decimal aligning movement of the latter and to thereafter enter into said actuator the digits occurring after the decimal point.

Other objects and advantages will become apparent from the following detailed description of the invention in which:

Fig. 7 is an enlarged right side view of a factor indicator numeral wheel and an associated decimal point indicating mechanism.

Fig. 8 is a front sectional view of the mechanism shown in Fig. 7.

Fig. 9 is a view of the same mechanism shown in Fig. 7 with the numeral wheel in a value display position, and the decimal point in decimal display position.

Fig. 10 is an enlarged, exploded isometric projection as seen from the right front of the machine showing part of the mechanism shown in Figs. 7 and 9.

*General description*

Figure 1:
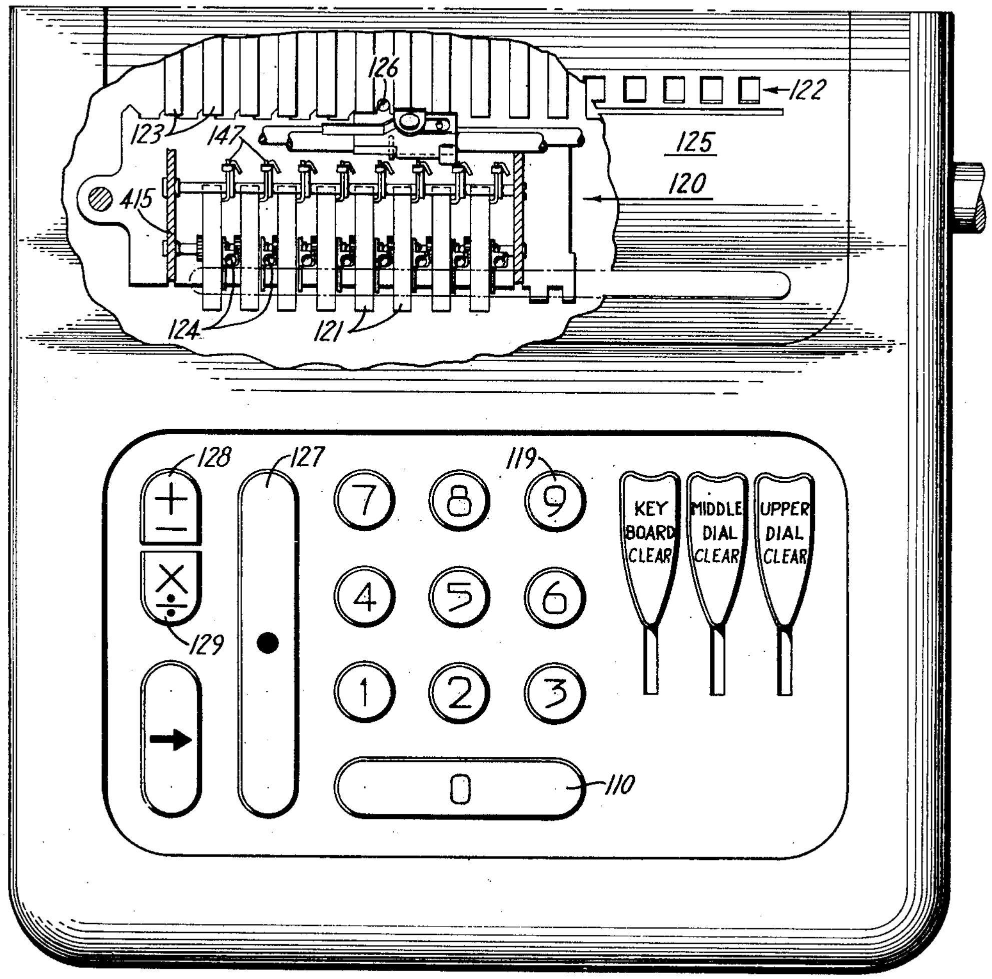
Fig. 1 is an exterior plan view of the machine partly cut away to show the internal decimal controls.

The calculating machine embodying the present invention has ten numeral keys 110–119 (Figs. 1 and 3), the depression of which is effective through the intermediary of the value entry device 136 (Fig. 3) to enter respective values in the various orders of a numeral wheel actuating mechanism, generally indicated at 120. The value entry device 136 includes a setting element 139 and a carrier 137 that is shiftable transversely of the machine and in so doing carries the setting element 139 with it to thereby shift the element from alignment with one order of the actuating mechanism to the next order.

The actuating mechanism is embodied in a carriage 120 that is mounted for transverse shifting movement relative to the accumulator register, and the factor indicator numeral wheels 121 (Figs. 1 and 3), which are mounted in the carriage, display the value entered in the actuating mechanism. The numeral wheels 123 (Fig. 1) of the accumulator register 122 are advanced during an actuating operation in accordance with the values previously entered into the ordinal actuators.

A result decimal point indicator 126 for the accumulator register is mounted for sliding movement relative to the various numeral wheels 123 and may be locked in any ordinal position of the register 122. An ordinal decimal point indicator 124 is provided adjacent each factor indicator numeral wheel 121, and each indicator 124 is normally hidden from view beneath the cover 125. Depression of the decimal point key 127 moves a selected factor decimal pointer 124 to a position of display, and also causes the actuator carriage to escape to the right and align the visible decimal 124 of the factor indicator 121 with the single decimal 126 of the register 122.

A plus-minus key 128 is provided to condition the machine for problems of addition and subtraction, while the multiply-divide key 129 conditions the mechanism for performing multiplication and division and for pointing off the decimal in the product and quotient. This latter mechanism is the subject of a copending application serial number filed on even date herewith.

Figure 18:
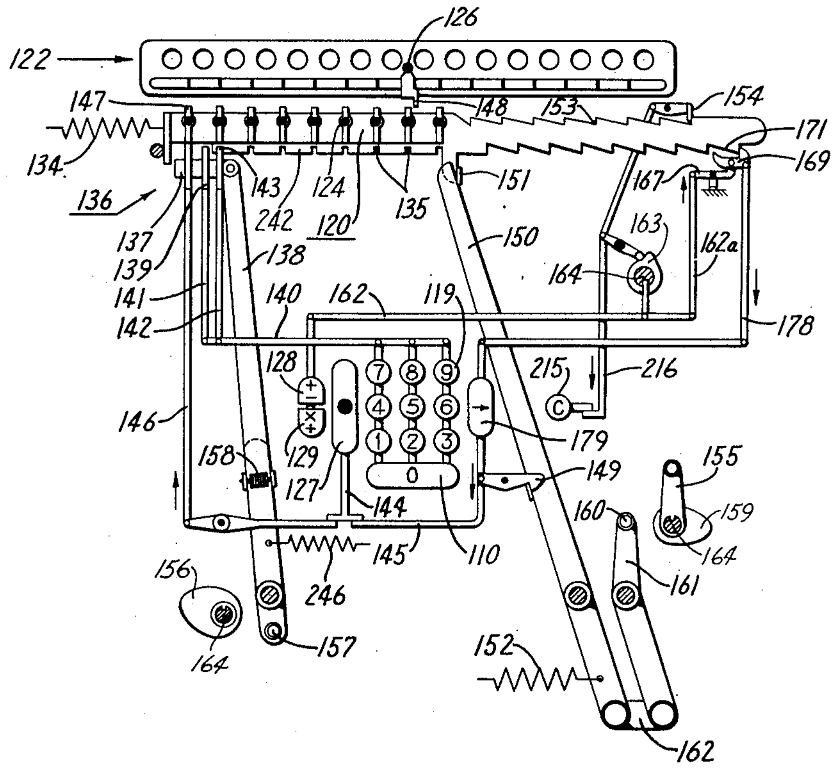
Fig. 18 is a schematic illustration of the invention showing the value entry keys, the decimal key, the plus-minus key, the hand crank and the decimal and shift mechanisms controlled thereby.

The general operation of the machine may be better understood by reference to the schematic illustration shown in Fig. 18. The accumulator register is indicated at 122 and the actuator carriage is indicated at 120. The latter is shown in its initial leftmost position to which it is urged by a spring 134. The actuator carriage 120 is provided with a series of ordinal notches 135 which serve as an escapement rack for the carrier 137 and its setting element 139. The carrier is urged to the right by a lever 138 and a spring 246, but is normally locked in its initial leftmost position where it is aligned with the leftmost order of the actuator carriage 120.

The carrier 137 supports the setting element 139 which enters values into various orders of the actuating mechanism. Under depression of keys 110–119, the linkage 140, 141 causes the setting element to adjust the highest (leftmost) order actuator in accordance with the value of the key depressed. Meanwhile, link 142 is reciprocated by the same numeral key depressed and moves an escapement finger 143 back and forth to cause a one order rightward escapement of the carrier 137 and its setting element 139 relative to the actuator carriage 120.

The operator continues to depress the keys 110–119 and enter values in successive orders of the actuating mechanism until the decimal point in the factor is reached. Then the decimal key 127 is depressed which moves links 144, 145 and 146 in the direction of the arrows shown in Fig. 18. Link 146 ejects the one of the stop members 147 with which it is aligned at the time the decimal key is depressed and the normally hidden decimal indicator 124, carried by the ejected stop member, is moved into view. Link 145 moves a latch 149 counterclockwise and releases an actuator carriage shift lever 150 which also may be released by depressing a right shift key 179, as is more fully explained hereinafter. Upon release, the shift lever 150 responds to a spring 152, whereupon the upper extremity of the lever contacts a lug 151 on the actuator carriage and moves the carriage to the right until such movement is stopped by contact of the ejected stop member 147 with a lug 148 of the register decimal carrier 126. At such time the factor decimal indicator 124 is aligned with the decimal indicator 126 for the accumulator register. During the above mentioned shifting movement of the actuator carriage 120, a toothed rack 153 integral therewith moves to the right at which time a pawl 154 yields as it slides over the inclined surface of the teeth 153. At the end of the rightward movement of the rack, the pawl 154 engages a respective tooth of the rack to prevent return movement of the actuator carriage 120.

The carrier 137 moves with the actuator carriage 120 during the rightward shifting movement of the latter and at the end of such movement the keys 110–119 may be again depressed to enter into the actuator the digits following the decimal point of the factor. After the selected value is entered, a hand crank 155 is rotated once in either an additive or subtractive direction to advance the numeral wheels of register 122 in accordance with the values entered into the actuators.

The latter part of the rotation of the hand crank causes restoration of the carrier and the actuator carriage to their respective initial positions, and also resets the factor indicator 121 and the ordinal actuators to their initial blank conditions. During the early part of the hand crank cycle a cam 156 (Fig. 18), driven by the crank, contacts a roller 157 carried by the lever 138 and returns the lever and the carrier 137 to their initial leftmost positions with respect to the actuator carriage. A spring yield 158 is provided in case the carrier is restored before the carriage 120 is fully restored.

The actuator carriage 120 is held in its position of decimal alignment with the numeral wheel register 122 throughout the digital actuating operation by the pawl 154 which engages with rack 153. During this actuating operation, the right shift lever 150 is returned and locked in the initial counterclockwise position shown in Fig. 18 by a mechanism including a cam 159 driven by the hand-crank and a latch 149. Cam 159 rocks a lever 161 counterclockwise and through a link 162 restores the right shift lever 150 to its initial position in which it is retained by the latch 149. The spring 134 is therefore enabled to return the actuator carriage to its initial leftmost position when the pawl 154 is removed from restraining engagement with rack 153. For this purpose the depression of the plus-minus key 128 is effective through a link 162 to establish a key and slot connection between a cam 163 and the hand crank shaft 164. At the same time links 162 and 162*a* rock a lever 167 clockwise to lower an escapement pawl 169 out of operative relation with an escapement rack 171 fixed to the actuator carriage 120. Then during the latter portion of the hand crank cycle, and after the numeral wheel actuation is completed, the cam 163 withdraws pawl 154 from engagement with rack 153 whereupon spring 134 returns the actuator carriage 120 to its leftmost initial position.

According to the present invention the decimal key 127 is not used in multiplying and dividing operations and all shifting of the actuator carriage is accomplished by depression of a right shift key 179, which is schematically shown in Fig. 18 and described below in greater detail.

When the multiply-divide key 129 is depressed, the plus-minus key is raised thus moving link 162 in such manner as to break the connection between shaft 164 and cam 163, and also to move link 162*a* and raise the escapement pawl 167 back into operative relation with the rack 171. The disengagement of cam 163 from shaft 164 disables the connection between the hand crank and pawl 154 and the latter therefore remains in position to prevent leftward return shift of the actuator carriage during multicyclic operation of the handcrank in the various orders of the machine.

The raising of the escapement pawl 167 into operative relation with rack 171 enables mechanisms whereby escapement of the actuator carriage to the right may be performed under control of the right shift key 179. Depression of the latter key rocks the latch 149 out of engagement with the shift lever 150 to place the carriage 120 under spring tension for a shift to the right, and through link 178 rocks the pawl 169 clockwise to permit a partial escapement of the carriage 120. Release of the shift key 179 permits pawl 169 to return to its initial position shown whereupon the carriage 120 completes its step of escapement. In this manner the carriage may be shifted one or more orders to the right under the control of key 179. During each such escapement, pawl 154 slides over a respective tooth of the rack 153 and re-engages with the next tooth thereof.

During multiplying operations the multiplicand is entered into the actuator carriage 120 and then the hand-crank is turned a number of times corresponding to the value of the highest order multiplier digit, thus entering the product of the multiplicand times this highest multiplier digit into the product register. Then the right shift key 179 is depressed to escape the actuator to the next lower order of the product register and the above described process is repeated in this order. This continues, order by order, until the entire multiplier value has been entered into the machine at which time the product is shown in the product register. The product decimal point 126 is then manually set in accordance with the total number of decimal places in the multiplicand and multiplier factors.

If it is desired to enter the product around a fixed decimal point in the product register, the multiplicand is entered into the actuator carriage by the value keys 110–119 after which the actuator carriage may be shifted under the control of the right shift key 179 one or more orders to the right as required for the particular multiplication problem.

At the conclusion of the multiplying operation the actuator carriage may be returned to its initial position by depressing a clear key 215 which moves link 216 in the direction of the arrow, thus rocking pawl 154 counterclockwise out of engagement with the rack 153. At such time the spring 134 returns the carriage 120 to its leftmost position to prepare the machine for the next calculating operation.

In the following description the reference numerals used in connection with the schematic drawing shown in Fig. 18 will be used whenever possible to designate corresponding parts of the machine structure.

*Value entering mechanism*

The value entering mechanism includes the numeral keys 110–119 (Fig. 7), the carrier 137 (Fig. 3), and a setting element 139. Depression of a key 110–119 is effective to perform four principal operations: (1) to move the setting element 139 to the left, as viewed in Fig. 6, by an amount corresponding to the value of the key depressed; (2) to release an ordinal actuator setting arm 166 (Fig. 6) from the restraint of a pawl 168 and cause the arm to be set in a counterclockwise position under the control of the setting element 139; (3) to lock the arm 166 in its newly set position; and (4) to escape the carrier 137 and the setting element 139 to the next lower order of the actuating mechanism where the value entering operation may be repeated. These four operations are performed by the mechanism described below.

Figure 3:
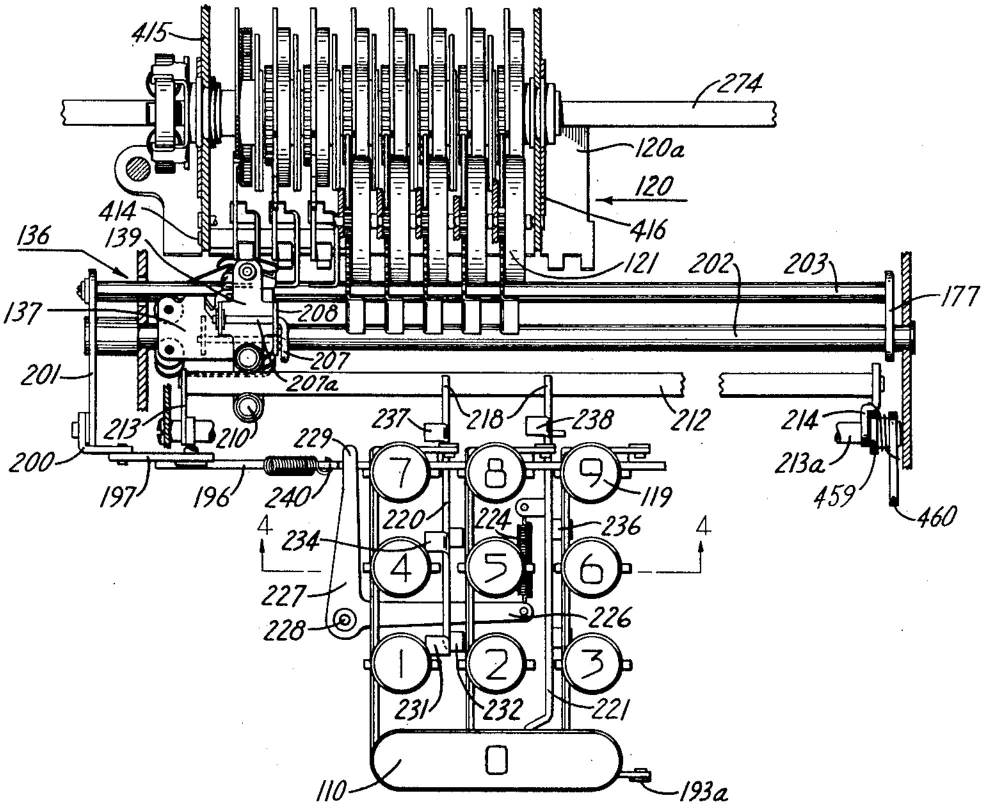
Fig. 3 is a plan view partly in section showing the keyboard, the single order value entry device and the numeral wheel actuators.
Figure 4:
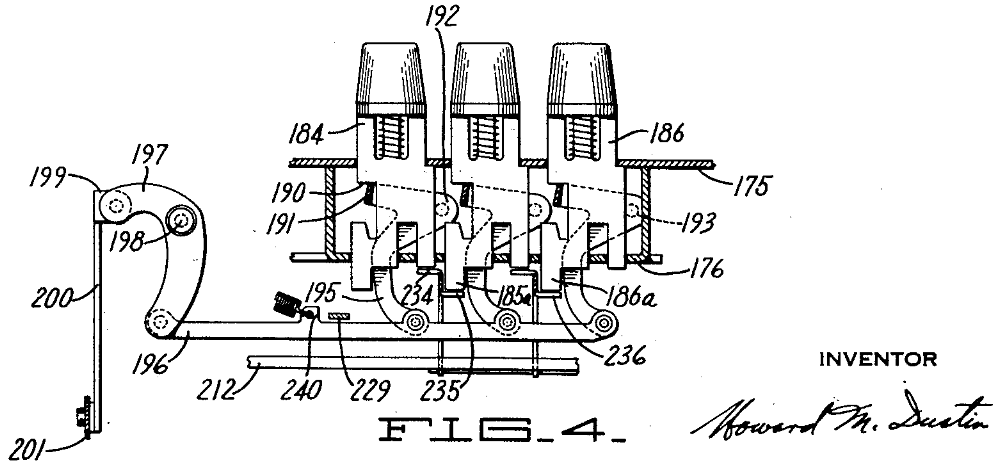
Fig. 4 is a front view partly in section taken along the line 4—4 in Fig. 3, showing three numeral keys and associated mechanisms.
Figure 5:
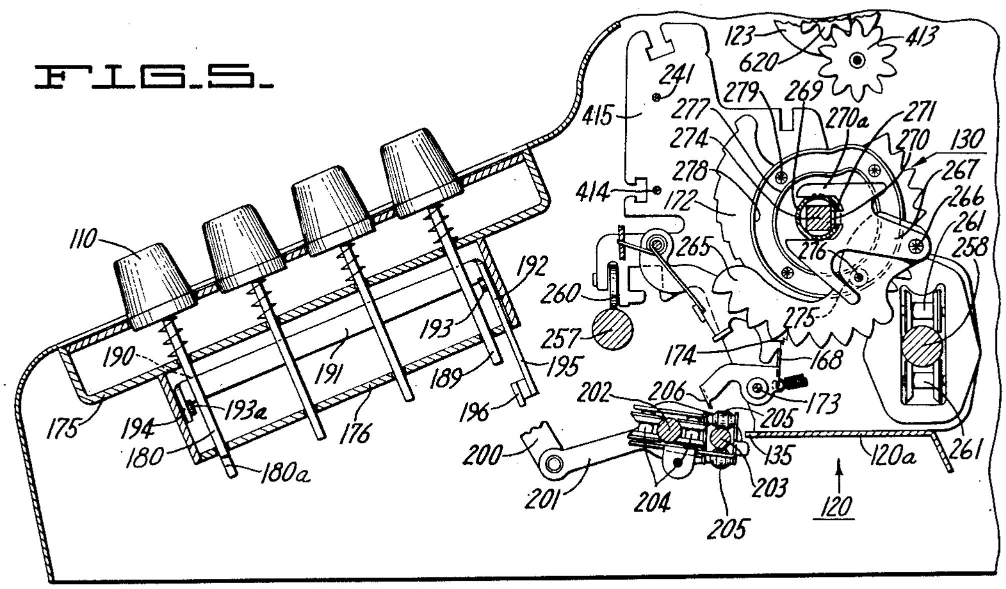
Fig. 5 is a right side view, partly in section, showing the numeral keys and the numeral wheel actuating mechanism.

Keys 110–119 (Figs. 3, 4 and 5) have stems 180–189 which are mounted for up and down sliding movement within respective slots cut in a pair of frame members 175, 176. The keys are spring urged upwardly to the position shown. Each key stem 180–189 has a shoulder 190 (Figs. 4 and 5) which overlies a respective one of three members 191. Each member 191 is in the form of an elongated U-shaped bail that is pivotally mounted on the framework of the machine by a pivot 193 at the rear and pivot 193*a* at the forward end thereof. The respective rearward lower extemity 195 of each bail is pivotally connected to a common link 196 (Fig. 4) which is connected to the value entering device as follows. The leftmost end of link 196, as viewed in Fig. 4, is pivotally connected to a bellcrank 197 which is pivotally mounted on a stud 198 carried by the machine framework. The upper end of bellcrank 197 is pivotally conneted to a bent ear 199 on the upper end of a link 200 (Figs. 4 and 5). The lower end of link 200 is pivotally connected to a lever 201 (Fig. 5) fixed to the leftmost end of a transverse shaft 202. The shaft is suitably mounted for rocking movement in bearings on the right and left frame plates of the machine.

From the foregoing description it is seen that depression of a key 110–119 causes the shoulder 190 (Fig. 4) thereof to rock bail 191 counterclockwise, and through like 196, the bellcrank 197, and link 200, to rock the lever 201 (Fig. 5) counterclockwise. A rearward extension of lever 201 carries one end of a shaft 203 which is parallel to shaft 202 and the other end of the shaft 203 is carried by an arm 177 (Fig. 3) fixed to shaft 202. In this manner shaft 203 is maintained in parallel relationship with shaft 202 and is rocked counterclockwise around shaft 202 when the latter is rocked clockwise by depression of any key 110–119.

The carrier 137 is mounted for movement along shafts 202 and 203 by four rollers 204 (Figs. 5, 6 and 16) associated with shaft 202, and also two rollers 205 for shaft 203. The carrier 137 is normally in its leftmost position where the setting element 139 is aligned with the highest order of the actuating mechanism. In this position the uppermost roller 205 (Fig. 5) underlies an ear 206 formed on the highest order pawl 168. The depression of a key 110–119 therefore is effective through the counterclockwise rocking of shaft 203 about the shaft 202 to raise roller 205 into engagement with ear 206 and move the pawl 168 clockwise out of restraining engagement with the setting arm 166 (Fig. 6).

Figure 6:
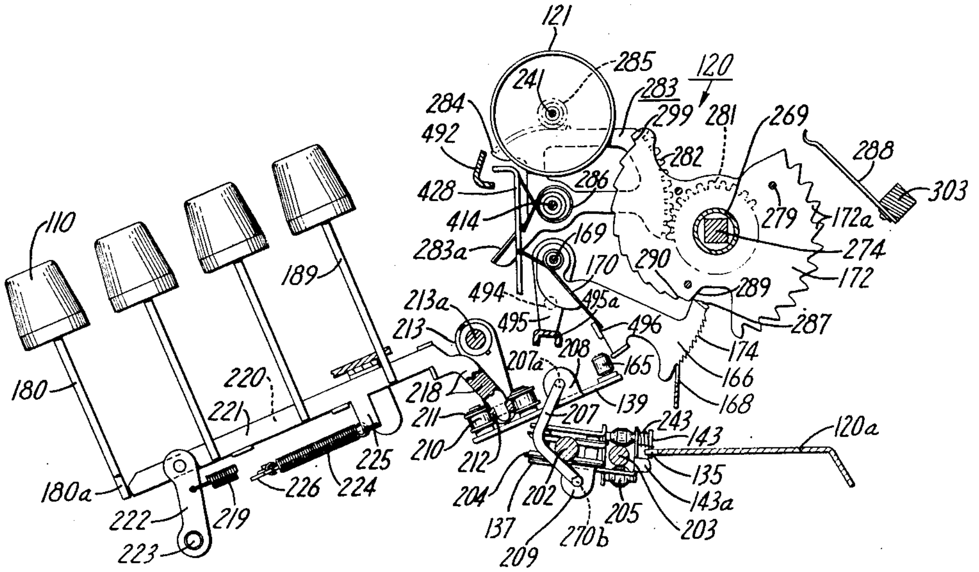
Fig. 6 is a right side view showing the numeral keys and associated mechanisms for entering a selected numeral value in a respective order of the actuator.

Meanwhile, the depression of a key 110–119 moves the element 139 and the stop pin 165 to the left as seen in Fig. 6 by an amount corresponding to the value of the key depressed, thus permitting the stop arm to rock clockwise a proportionate amount. For this purpose the setting element 139 is pivotally supported by a rod 207 which, at its upper end, has a bent extension 207*a* (Figs. 3 and 6) projecting through a pair of ears 208 extending upwardly from the setting element 139, and which rod 207 has a similar bent extension 207*b* (Fig. 6) projecting through a pair of ears 209 extending downwardly from the carier 137.

The setting element is further supported by a transverse rail 212 (Figs. 3 and 6) and is slidably mounted on the rail for shifting movement relative thereto. For this purpose the element has a pair of opposed rollers 210 rotatably mounted thereon, and each roller has respective upper and lower flanges 211 (Fig. 6) that embrace the rail. The latter is supported by arms 213 and 214 (Figs. 3 and 6) fixed to a transverse shaft 213*a*.

A pair of arms 218 extend from the selection bars 220 and 221, and are fixed to the rail 212. The selection bars 220 and 221 are each supported at their forward ends by a respective link 222 pivoted on a stud 223 and are urged rearwardly by a single spring 219 which is connected to one of the links 222.

Upon depression of a numeral key 110–119, a spring 224 (Fig. 6) is tensioned, by mechanism described below, to urge the selection bars 220 and 221 forwardly, and the amount of such movement is determined by the value of the key depressed. The setting element 139 and the stop pin 165 are thus moved forwardly a like amount to limit the clockwise movement of the setting arm 166.

The keys 110–119 determine selective movement of the selection bars 220–221 and the setting element as follows. Spring 224 is connected at one end to a lug 225 depending from selection bar 221 and at its other end is connected to the rightwardly extending arm 226 (Fig. 3) of a bellcrank 227. The latter is pivotally mounted on a stud 228 carried by the machine framework. The upper arm 229 of the bellcrank 227 lies adjacent a lug 240 formed on link 196 (Figs. 3 and 4). It will be recalled that depression of a key 110–119 moves link 196 toward the right. At such time lug 240 (Fig. 3) engages bellcrank 227 and rocks the same clockwise, thus tensioning the spring 224 and urging the selection bars 220 and 221 forwardly of the machine against the tension of spring 219 (Fig. 6).

In order to selectively position the selection bars 220 and 221 in accordance with the value of a depressed key, the selection bars have lugs 231–238 corresponding to the values "1"–"8," no lugs for the values "0" and "9" being necessary for reasons that will appear later. When a key 111–118 is depressed a downwardly extending portion 181a–188a (Fig. 4) of the respective key is moved into the path of its corresponding lug 231–238 to limit the forward movement of the selection bars 220–221. The "0" keystem 180 (Fig. 6) has a notch 180a to permit leftward movement of the selection bar 221 in response to depression of any key 111–119. Depression of the "0" key 110, however, moves the notch 180a out of alignment with the selection bar 221 and moves the keystem 180 of the "0" key into the path of selection bar 221. The latter is therefore retained substantially in the position shown in Fig. 6. Depression of the "9" key 119 permits the selection bars 220–221 to move leftward nine increments whereupon further movement of the bars is blocked by a limit pin (not shown).

There are a plurality of setting arms 166 (Fig. 6) corresponding to the number of actuator orders, and the setting element 139 is shifted step by step into operative relation with each setting arm in a manner described hereinafter. Only one setting arm is shown in Fig. 6 and the following description will be of one such arm, with the understanding that each of the others is constructed and operated as described below.

Each setting arm 166 (Fig. 6) is pivotally mounted on a transverse shaft 169 carried by the actuator carriage 120 and is urged clockwise against a stop pin 165 by a torsion spring 170. An ear 287 is carried on each arm and lies adjacent the lowest step 289 of a series of graduated steps 289–299 on an actuator selection plate 172. The steps 289–299 represent the values "blank" and "0" to "9," respectively. Ear 287 normally maintains plate 172 in "blank" position. Arm 166 normally is locked in the position shown by a pawl 168 (Fig. 5) which is spring urged counterclockwise about a shaft 173 into engagement with teeth 174 formed on the lower extremity of the setting arm 166.

From the foregoing description it is seen that depression of a key 110–119 is effective to rock pawl 168 and release the actuator setting arm 166 for clockwise movement, whereupon it contacts the stop pin 165 carried by the setting element 139. Furthermore, the depression of a key controls the movement of the element 139 and the stop pin toward the left (Fig. 6) a selective amount thus effecting the adjustment of the setting arm in a clockwise position corresponding to the value of the key depressed.

The setting arm 166 is retained in its adjusted position after depression and release of a numeral key as follows. When a depressed key 110–119 is released, the setting element 139 is returned to its initial clockwise position thus moving roller 205 from beneath ear 206. This permits the pawl 168 to return counterclockwise to its initial position and re-engage one of the teeth 174 of the setting arm 165. This holds the arm in the position previously set by the depression of the key. The adjustment of the setting arm to a respective value representative position is maintained until the selected values are cleared from the actuating mechanism as later described.

Figure 16:
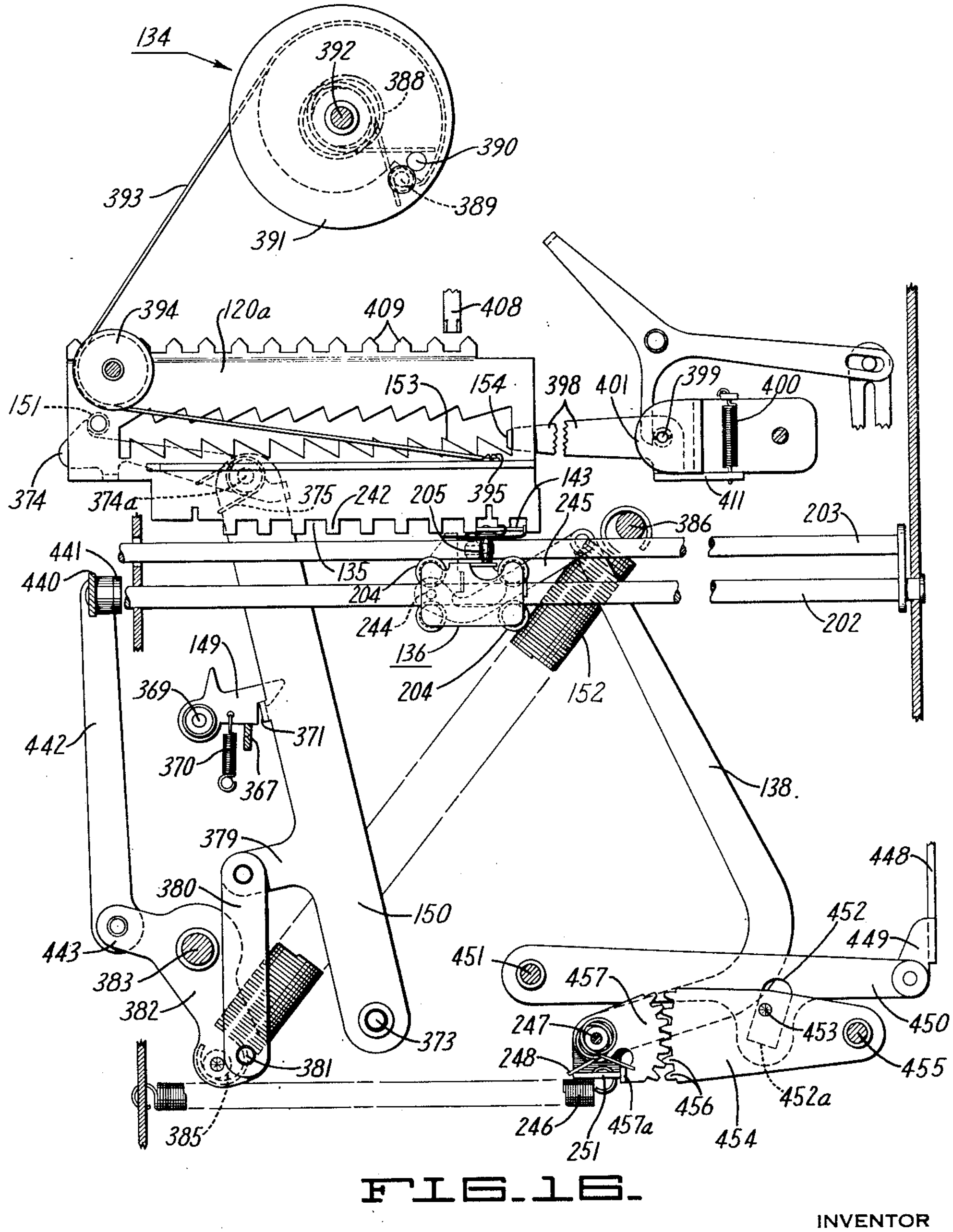
Fig. 16 is a plan view in section of the respective shifting mechanisms for the value entry device and the actuator carriage.

The carrier 137 and its setting element are shifted step by step relative to the actuating mechanism by spring means and such shifting movement is controlled by an escapement mechanism described below. A stud 244 (Fig. 16) projects downwardly from the carrier 137 and a link 245 is connected to the stud in such a way as to allow pivotal motion of the link upon stud 244 during the shifting of carrier 137 and to also allow the rocking motion of the entry device upon shaft 202 during the setting operation. The right end of link 245 is pivotally connected to an arm 138 which is freely mounted on a stud 247 fixed to the bottom frame of the machine. An upturned ear 251 is formed on a forwardly extending portion of arm 138 as seen in Fig. 16, and a spring 246 is connected between this ear and the machine frame to urge the arm 138 clockwise about its pivot 247, thereby urging the carrier 137 toward the right of the machine.

The carrier 137 is initially in its leftmost position shown in Fig. 3, where its setting element 139 is aligned with the leftmost or highest order of the actuating mechanism, and is escaped step by step one order to the right each time a key 110–119 is depressed and released. The depression and release of a key 110–119 is effective by the reciprocation of the carrier 137 about shaft 202 to permit such escapement under control of the following mechanism. The bottom frame 120a of the actuator carriage 120 (Figs. 5 and 16) has a series of notches 135 corresponding to the ordinal spacing of the actuating mechanism. Cooperating with these notches is a pair of escapement fingers 143 and 143a (Fig. 6). Escapement finger 143 is pivotally mounted for limited movement on a stud, secured to carrier 137 and is urged by spring 243 into contact with finger 143a which, as seen in Fig. 6, is an extension of the carrier. In the initial position shown in Fig. 6, the escapement finger 143 is engaged with a respective notch 135 while finger 143a lies below the plane of the notches. Finger 143a is positioned slightly to the left of that portion of finger 143 which contacts a respective tooth of the escapement rack 135. When a key is depressed and the carrier 137 is rocked counterclockwise, the finger 143 is lifted out of contact with the tooth and at the same time finger 143a engages the same tooth, thus permitting but a minimum of movement of the carrier. When the depressed key 110–119 is released the carrier 137 returns clockwise to its initial position at which time escapement finger 143a is withdrawn from the tooth and escapement finger 143 is brought down on top of the tooth, the spring 243 yielding. As the carrier moves to the right, the escapement finger 143 drops off of the tooth into the next adjacent notch 135 and engages the next ordinal tooth. With this condition of the parts the next key 110–119 may be depressed to enter the next digit into the machine and again shift the carrier and the setting element in the same manner as described above.

The following mechanism is provided to rotate an indicator dial 121 (Fig. 6) to a position in which it displays the value set up in its associated order of the actuating mechanism. Each of a plurality of selector plates 172 is freely and independently mounted on a sleeve 269, one plate being provided in each order of the actuating mechanism. A gear 281 is integral with each selector plate 172 and meshes with a gear segment 282 formed on a member 283. The latter is freely mounted on a shaft 414 carried by the actuator carriage end frame members 415 and 416 (Figs. 3 and 5). A second gear segment 284 (Fig. 6) is formed on member 283 and meshes with a gear 285 integral with the indicator dial 121. One end of a torsion spring 286 abuts an intermediate actuator carriage frame member 428 while the opposite end underlies an ear 283a on member 283. The spring 286 tends to rotate member 283 clockwise and thus rotate the selector plate 172 counterclockwise but rotation of the selector plate is normally blocked by the ear 287 formed on the previously mentioned setting arm 166. When a key 110–119 is depressed and the setting arm 166 is rocked counterclockwise a selected amount, then ear 287 is moved out of the path of a shoulder 289 on the selector plate 172 and moves into blocking relation with one of a plurality of shoulders 290–299 representing the selections "0" to "9" respectively. In this manner the depression of a key 110–119 controls the rotation of the selector plate 172 and during such rotation the dial 121 is rotated a proportionate amount to indicate the value selected. Early in the hand crank cycle a pawl 238, fixed to a square shaft 303, is rocked counterclockwise as described hereinafter to lock the selector plate in its selectively set position.

The entry of ordinal values into the actuating mechanism and into the indicator dials 121 progresses from left to right in the same manner as one would write the values on paper, and when the decimal point is reached, the decimal key 127 (Fig. 1) is depressed. The depression of key 127 shifts the actuator carriage to the right to a position of decimal alignment with the product decimal point 126 and sets the decimal point to the right of the last digit entered into the indicator 121. Such shifting is controlled jointly by a selective ordinal stop member 147 (Figs. 1, 9 and 10) of the indicator 121 and a stop lug 148 of the product register decimal indicator, as will be described later.

With respect to the control mechanism for the ordinal stop members 147 for determining the position in which the carriage will be stopped, each indicator numeral wheel 121 (Fig. 7) carries an arm 323 including ear 324 which lies adjacent an extension 325 of its associated stop member 147. The latter is freely pivoted on a transverse shaft 326 carried by the actuator carriage, and is urged clockwise by a torsion spring 327. One end of spring 327 (Fig. 8) overlies member 147 and the opposite end of the spring passes through a hole in an intermediate frame plate 328 of the actuator carriage. With the parts in the initial position shown in Fig. 7, ear 324 contacts extension 325 and prevents clockwise movement of the stop member 147. When an indicator wheel 121 is rotated counterclockwise to display the selection made in its respective order, the arm 323 rotates therewith and permits member 147 to rock clockwise under urge of spring 327, to the position shown in Fig. 9. Such movement is limited by contact of member 147 with the upper leftward end of a slot 329*a* cut in the back frame 329 of the carriage.

The rightmost, or last, member 147 which is so moved is adapted, upon depression of the decimal key and the resulting rightward shifting movement of the actuator carriage, to engage the stop lug 148 of the accumulator register decimal point. Such engagement limits the shifting movement of the carriage to a position of decimal alignment of the actuator with the accumulator register as will appear later.

Also associated with each indicator dial 121 (Figs. 7 and 8) is a decimal carrier 330, freely pivoted on support shaft 241, and which carrier has a decimal point 124 delineated upon an ear 331 thereof. A latch lever 332 is freely mounted on a stud 333 carried by the intermediate actuator carriage frame member 328, and the latch normally engages with an offset 338 of the carrier 333 to hold the carrier in the position shown in Fig. 7. In this position the decimal point 124 lies beneath the cover 125 and cannot be seen through the window 335 of the cover. A torsion spring 336 is provided, with one end overlying an ear 337 on the latch lever and the other end overlying the offset 338 formed on the carrier 330. Spring 336 therefore serves two purposes; (1) it urges the latch lever clockwise into locking engagement with the carrier 330, and (2) it urges the carrier counterclockwise about shaft 241.

A slide 339 (Figs. 9 and 10) is provided in each order to release its respective decimal carrier. Each slide is conditioned by the entry of a digit in its respective order and when the carriage is escaped by depression of the decimal key, the last or rightmost slide that has been so conditioned trips the latch 332 and releases its decimal point carrier for movement to indicating position. For this purpose slide 339 is provided with a slot 340 which embraces a roller 341 on shaft 326. The slide 339 lies between the stop member 147 and the ordinal frame member 328, as seen in Fig. 8, and has a pair of transverse arms 342 and 343 (Figs. 8 and 10) which embrace the upper end of the stop member 147. The previously mentioned torsion spring 327 overlies the release slide 339 as well as the stop member 147 and also serves through engagement with an ear 344 of said slide to hold the slide in its extended position shown in Fig. 7.

It was mentioned above, that the depression of the decimal point key releases the carriage for movement toward the right of the machine, and that such movement is arrested when the rightmost stop member 147 that is set engages the stop lug 148 of the product decimal point indicator. As the stop member 147 approaches the stop lug 148, the latter engages the inclined camming nose 339*a* and cams the slide downwardly as viewed in Fig. 8 or toward the left as viewed in Fig. 9. Upon such movement of the slide, the rounded end thereof engages the upwardly extending tail of latch 332 and trips the latter. When the latch is tripped it releases the decimal point carrier for movement, under urge of spring 336, to the indicating position shown in Fig. 9.

When the carriage shifting movement is arrested by stops 147 and 148, the decimal point of the factor, as indicated by the carrier associated with the effective stop 147, is thus brought into alignment with the decimal point of accumulator register as indicated by the carrier of the stop lug 148. Subsequent operation of the numeral wheel actuators, described in the next section, causes registration of the factor in proper decimal relation to the position of the decimal point in the accumulator register.

Since the entry of a value into an order of the actuator carriage moves a respective stop member 147 to the position shown in Fig. 9 for subsequent engagement with the stop lug 148, it will be obvious that if the decimal key were depressed before a value is entered into the actuator carriage then no stop member would stand in position to engage the stop lug and the carriage would be shifted past the lug to the full extent permitted by the machine, if means were not provided to prevent it.

The arrangement is such, therefore, that the stop member 147 which is associated with the leftmost indicator dial 121 is fixed in the position shown in Fig. 9. Thus, upon depression of the decimal key and shifting of the actuator carriage toward the right of the machine, the leftmost stop member 147 engages the stop lug 148 and stops the shifting movement when the leftmost order of the actuating mechanism is aligned with the first order to the right of the decimal indicator of the accumulator register. At the same time the stop lug 148 moves the slide 339 (Fig. 9) to the left and rocks latch 332 counterclockwise thus releasing the decimal carrier 330, but movement of the carrier to the position shown in Fig. 9 is prevented at this time since a value has not been entered in this order of the actuator and the projection 323*a* (Fig. 7), which is integral with the indicator dial, underlies the ear 330*a* on the decimal indicator. As soon as one of the value keys 0–9 is depressed and the leftmost dial 121 moves counterclockwise to indicate the value entered, the projection 323*a* moves away from ear 330*a* on the decimal indicator, the latter then moving to decimal indicating position.

*Numeral wheel actuating mechanism*

The actuating mechanism, indicated generally at 130 (Fig. 5), comprises a series of eight ordinal numeral wheel actuators which, upon rotation of a hand crank, advance the numeral wheels 123 (Fig. 1) of the accumulator register 122 according to the values entered into the actuators. The actuators are supported upon the carriage 120 (Fig. 5) which is shiftable relative to the numeral wheels so that selected groups of numeral wheels may be advanced by the actuators.

The actuating mechanism operates on the same principle as the actuating mechanism disclosed in the Patent No. 1,524,924, issued February 3, 1925, but in the present case the actuating mechanism is shiftable and the accumulator register remains in a fixed lateral position in the machine, whereas in the above patent the register is shiftable and the lateral position of the actuators is fixed. In either case the actuators and the numeral wheels are shifted relative to each other to permit the actuator to advance selected groups of numeral wheels.

The carriage 120 (Figs. 3 and 5) which supports the actuating mechanism is mounted for movement on the transverse shafts 257 and 258 (Fig. 5) by means of anti-friction rollers 260 and 261 respectively. Each ordinal actuator includes a toothed segment 265 for advancing an idler gear 413 by differential amounts. The gear 413 is the drive receiving gear of a gear train including gear 620 to an aligned numeral wheel of the accumulator register. Segment 265 is freely pivoted at 266 to a carrier plate 267. The latter is fixed to the sleeve 269 by means of a key 270 protruding through a hole 271 in said sleeve and also by prongs 270*a* passing through ordinally spaced slots cut in said sleeve. The leftmost end of the key 270 is swedged over inside the sleeve and lies adjacent one side of a square transverse shaft 274. The arrangement is such that the carrier plate 267 and the sleeve 269 are rotated whenever shaft 274 is rotated and are also shiftable along the axis of the shaft.

A roller 275 shown in dotted lines in Fig. 5 is mounted on a stud 276 carried by the toothed segment 265 and which roller rides between a pair of complementary cam surfaces 277 and 278. The latter surfaces form a "box" cam which is fixed by studs 279 to the selector plate 172. The selector plate in each order is set under control of the numeral keys 110–119 and related value entering mechanism described hereinbefore; therefore the box cam is rotated to a corresponding position and is effective in such position to control the in and out movement of the toothed segment 265 when the latter is rotated with shaft 274. This controls the amount of advance of the gear 413 and its related numeral wheel 123 (Fig. 1) of the accumulator register.

Figure 12:
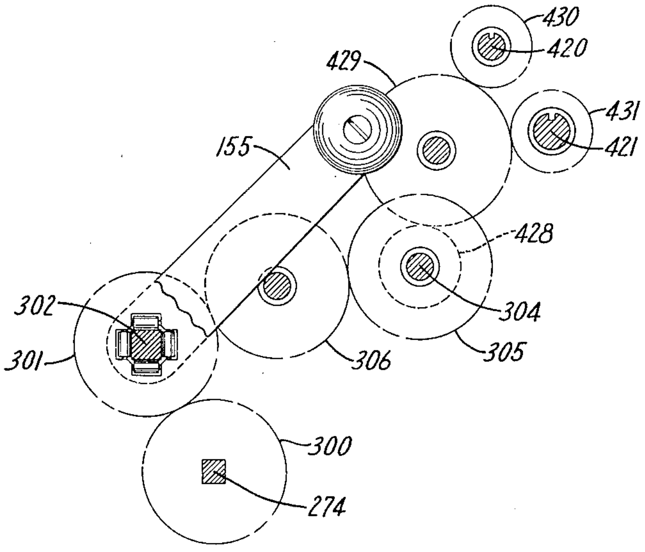
Fig. 12 is a right side view of the hand crank and the drive train from the hand crank to the actuator drive shaft and other parts of the machine.

The actuator drive shaft 274 has mounted on its right end, a gear 300 (Fig. 12) which meshes with a gear 301 fixed to the hand crank shaft 302. Rotation of the hand crank 155, therefore rotates shaft 274 (Fig. 5), the carrier plate 267, the sleeve 269 and the gear segment 265 in each order of the actuator. Since each selector plate 172 and its integral box cam 277—278 are held locked in a selected position by the pawl 288 during rotation of the gear segment 265 about the square shaft 274, the box cam is effective through the roller 275 to cause an in and out movement of the segment 265 relative to shaft 274. The selectively set position of the box cam 277—278 determines the timing of such in and out movement, as described in said Patent No. 1,524,924, and is effective to advance the gear 413 in the gear train to an associated numeral wheel 123 (Fig. 1) in accordance with the value selected for that order.

*Accumulator register*

The accumulator register 122 (Fig. 1) comprises the numeral wheels 123 which are advanced by the actuating mechanism, described above. A tens carry drum of the type shown in the Patent No. 1,474,230 issued November 13, 1923, is mounted on shaft 304 (Fig. 12) for effecting the tens carry operation. Shaft 304 has gear connection 305, 306 with the hand crank gear 301 so that the tens carry operation is carried out in timed sequence with the digital actuating operation.

*Decimal control mechanism*

The decimal control mechanism includes a decimal point key 127 (Fig. 1) and the product register decimal point 126 which may be manually set in any ordinal position of the product register. Depression of key 127 is effective to: (1) control the setting of a decimal in a selected ordinal position of the factor indicator 121 and, (2) to cause the actuator carriage 120 to shift to a position in which the selected decimal indicator 124 is aligned with the manually set decimal point 126.

Figure 2:
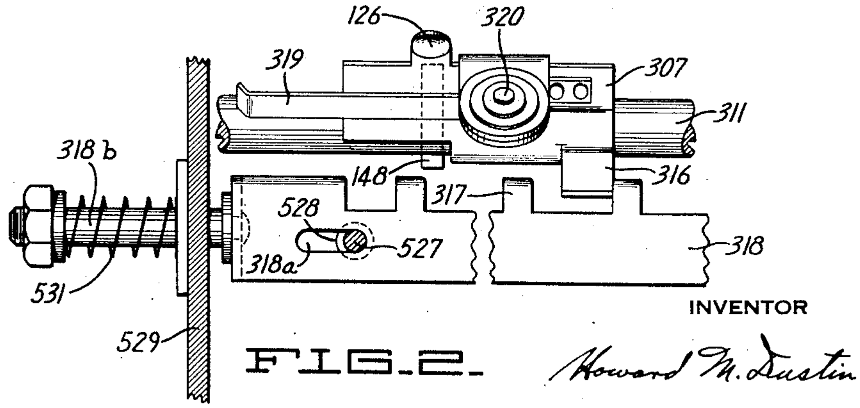
Fig. 2 is an enlarged plan view of the accumulator decimal point and related means for holding the same in its ordinally set position.

The accumulator decimal 126 (Figs. 1, 2, and 7) is delineated on an extension of a decimal carrier comprising a pair of members 307 and 308 (Fig. 7) riveted together and having enveloping extensions **307*a* and 308*a* which embrace a collar 310 slidably mounted on a keyed shaft 311**.

An extension 316 (Figs. 2 and 7) projects from the member 307 and is adapted to engage between any two adjacent teeth 317 of a plurality of ordinal teeth on a rack 318. Rack 318 (Fig. 2) has three slots identical to slot **318*a* cut therein, each of which receives a reduced shank 527 of a stud 528. The three studs are fixed to the cover 125 (Fig. 1) and support the rack 318** (Fig. 2) for sliding movement underneath the cover.

A spring leaf 319 (Fig. 7), fixed to the decimal carrier 307, abuts the machine cover 125 and urges the decimal carrier clockwise to maintain the engagement of the extension 316 with teeth 317 of the rack. A thumb piece 320 is provided on the carrier 307 and may be depressed to rock the carrier counterclockwise against the tension of spring 319 to disengage the extension 316 from rack 318. The decimal carrier may then be slid to any selected ordinal position of the register 122 whereupon it is locked in such position upon release of the thumb piece.

From the above description it will appear that the decimal carrier 307 and the stop lug 148 are mounted for free sliding movement upon their respective shafts 311 and 315 but are connected together by the key 313 projecting through the collar 310 of the decimal carrier, so that when the decimal is moved to and locked in a selected decimal position, the stop lug 148 is similarly moved and locked in such position. When the stop lug 148 is thus locked; it is positioned laterally in a decimal position, but is normally out of the path of a stop member 147 that is set in the position shown by dotted lines in Fig. 7, so as to allow free shifting movement of the carriage during the calculating process and during return of the carrier to its initial position. The stop lug 148 is, however, mounted for movement from the position shown in Fig. 7 into the path of stop member 147 as shown in Fig. 9 by the depression of the decimal point key. For this purpose, the shaft 315 which carries the stop 148, is mounted for swinging movement about the center of shaft 311 by a pair of arms 321, fixed to the ends of shaft 311. Connections from the decimal key described immediately hereinafter are adapted upon depression of the key to rock shaft 311 clockwise and thus swing shaft 315 toward the left from the position shown in Fig. 7, to bring the stop lug 148 into the path of the stop member 147 as shown in Fig. 9. With the parts in the position shown in Fig. 9, the stop lug 148 is engaged by the rightmost stop 147 which is set and thus arrests the rightward shifting movement of the carriage.

The carriage is shifted by a spring actuated mechanism described hereinafter and consequently the stops 147 and 148 bring the carriage to an abrupt stop in the selected position. To absorb the shock of this abrupt stop, the rack 318 (Fig. 2), by which the decimal 126 is locked, is resiliently mounted upon a shaft **318*b* carrying a shock absorbing spring 531 together with a pair of studs 527** for guiding the rack during the shock absorbing movement.

*Decimal key*

After the digits to the left of the decimal point have been entered into the factor indicator 121 (Fig. 1), the decimal key 127 is depressed to release the actuator carriage for shifting movement to the right until such shifting is stopped by the engagement of the previously mentioned stop 147 (Fig. 9) with the lug 148.

The spring driven mechanism for moving the actuator carriage to a position of decimal alignment includes a shift lever 150 (Fig 16) which is connected to the actuator carriage and is under spring tension to effect the shifting movement when the decimal key is depressed. The connection between the shift lever 150 and the actuator carriage includes a hook 374 which is freely pivoted at **374*a* to the upper end of lever 150 and is urged clockwise by a torsion spring 152 into engagement with a roller 151 carried underneath the actuator carriage bottom plate 120*a*. This arrangement provides for constant engagement between the hook 374 and roller 151** throughout the shifting movement of the carriage.

Figure 11:
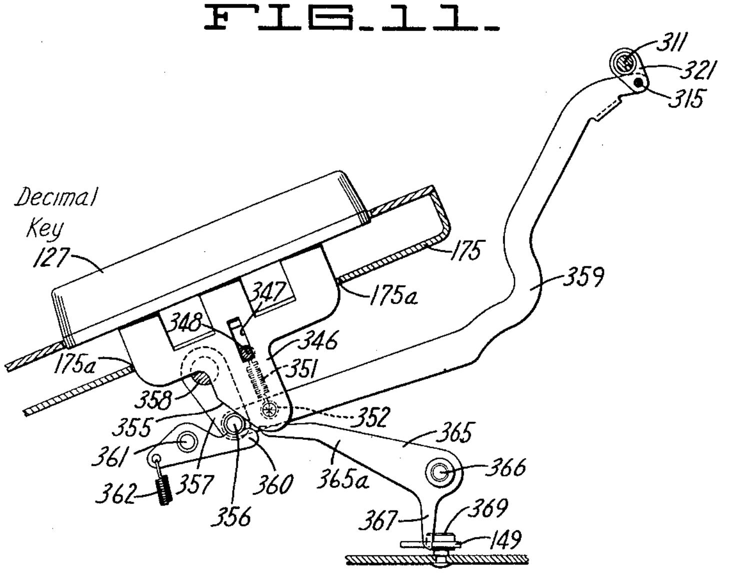
Fig. 11 is a right side view of the decimal point key and related mechanisms.

The shift lever 150 is pivotally mounted on a stud 373 fixed to the bottom frame plate of the machine and has an extension 379 which is pivotally connected to a link 380. The opposite end of link 380 is pivotally connected at 381 to a lever 382, freely mounted on a stud 383 carried by the bottom frame plate of the machine, and which lever 382 is urged counterclockwise by a spring 152 connected at one end to a stud 385 on lever 382 and connected at its opposite end to a stud 386 fixed to the bottom frame plate of the machine. The spring 152 therefore tends to move the shift lever 150 and the actuator carriage 120 toward the right, but such movement normally is prevented by a latch 149 which engages a downwardly bent ear 371 on the shift lever 150. Latch 149 is freely pivoted at 369 and is urged clockwise by a spring 370 into restraining engagement with the ear 371, but may be rocked counterclockwise by the depression of the decimal key 127 to release the shift lever 150. The decimal key stem 346 (Fig. 11) is guided for up and down movement in slots **175*a* cut in a keyboard frame plate 175 and also by a fixed stud 348 projecting through a slot 347 in the key stem. A spring 351, attached to the stud 348 and to a stud 352 on the lower end of the key stem normally holds the decimal key 127 in the raised position shown. Stud 352 overlies an arm 365*a* of a latch release lever 365 pivotally mounted at 366 and having a depending arm 367 (Figs. 11 and 16) lying adjacent to the latch 149. Depression of the decimal key therefore rocks the lever 365 counterclockwise and through the depending arm 367, moves the latch 149 counterclockwise out of restraining engagement with ear 371. At such time the shift lever 250** is free to move the actuator carriage toward the right.

Meanwhile, the depression of the decimal key rocks the shaft 315 (Fig. 11) clockwise about shaft 311 to the position shown in Fig. 9, in which position the stop lug 148 lies in the path of the controlling stop member 147 and limits the escapement of the actuator carriage toward the right. For this purpose a camming surface 355 (Fig. 11) is formed on the lower portion of the decimal key stem and overlies a stud 356 carried by a lever 357, freely pivoted to a fixed stud 358. Lever 357 is connected to a link 359 by the stud 356 and the rightmost end of the link 359 is pivotally connected to the previously mentioned shaft 315. Depression of the decimal key is therefore effective to move the stud 356 and the link 359 toward the left whereupon the shaft 315 is rocked counterclockwise about the shaft 311 and moves the decimal lug 148 to the "stop" position shown in Fig. 9. A spring urged detent 360 (Fig. 11) is pivotally mounted at 361 and is provided for engagement with the stud 356 to hold the stud and the related parts in either the initial position shown or in the position to which they are moved by the depression of the decimal key.

From the foregoing description it is seen that the depression of the decimal key causes rightward shifting of the actuator carriage and at the same time sets the stop lug 148 in the path of stop member 147 thereby stopping the shifting movement of the actuator carriage with the decimal point of the factor indicator 121 in alignment with the decimal indicator 126 of the accumulator register.

During rightward shifting of the actuator carriage 120, the value entry device 136 (Fig. 16) and the setting finger 139 (Fig. 6), carried thereby, are shifted with the actuator carriage since the escapement finger 143 (Fig. 16) of the entry device is engaged with a respective tooth 242 of the escapement rack on the actuator carriage. In this manner the ordinal relationship between the actuator carriage and the entry device is maintained throughout the shifting of the actuator carriage and after such shifting is completed the numeral keys 110–119 may be depressed to enter those values into the actuating mechanism which follow the decimal point.

The previously described rightward escapement of the actuator carriage 120 is powered by the spring 152 (Fig. 16) against the tension of a relatively weaker spring mechanism generally indicated at 134, thereby winding up the latter to provide the power for subsequently returning the actuator carriage to its initial leftmost position. The spring mechanism 134 includes a torsion spring 388, one end of which lies adjacent a stud 389 fixed to the bottom frame plate of the machine and the other end of which spring lies adjacent a stud 390. Stud 390 is carried by a disc 391 freely mounted on a shaft 392 fixed to the bottom frame plate of the machine. Spring 388 urges the stud 390 and the disc 391 clockwise, and through a tape 393, connected at one end to the disc 391 and at 395 to the actuator bottom plate 120*a*, constantly urges the actuator carriage toward the left. The idler pulley 394 for the tape is freely mounted on a post fixed to the machine framework.

The shift lever 150 is returned and locked in the initial counterclockwise position shown in Fig. 16 during the early part of the hand crank cycle, as described hereinafter, and such return occurs before the actuating cycle is completed. Means including an escapement pawl 398 and a centralizer pawl 408 are therefore provided to prevent the spring mechanism 134 from returning the actuator carriage to its leftmost position until after the actuating cycle is completed. Pawl 398 has an upstanding ear 154 which is adapted to engage with a toothed rack 153 formed on the actuator carriage bottom plate 120*a* to hold the actuator carriage in any escaped position thereof against the tension of the spring mechanism 134. The pawl 398 is pivotally mounted on a pin 399 and has an extension 411 (Figs. 15 and 16) to which is connected a spring 400 urging the pawl counterclockwise to the position shown in Fig. 16. During shifting of the carriage to the right in response to depression of the decimal key, the teeth of rack 153 exert a camming action on the pawl 398 and move the pawl clockwise out of engagement with successive teeth until such shifting is completed, whereupon the pawl re-engages a respective tooth 153.

Figure 15:
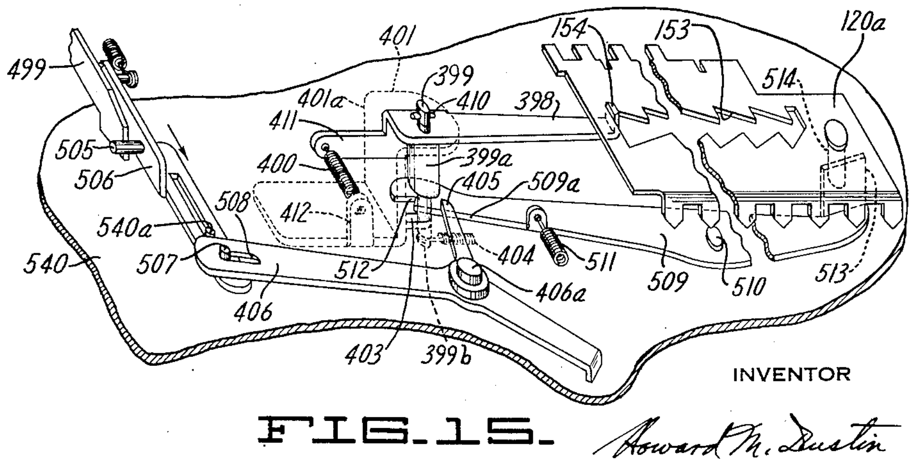
Fig. 15 is an isometric projection as viewed from the right rear of the machine showing the escapement mechanism for the actuator carriage.

The ear 154 of pawl 398 is later moved downwardly out of the plane of the rack 153 to permit the return of the carriage 120 to its leftmost position and for this purpose the pivot pin 399 (Fig. 15) for the pawl 398 is suspended at its upper end from a bracket 401 shown in dotted lines. A keeper pin 410, carried by the pivot pin 399, rests upon the upper portion of the bracket 401, the lower end 399*b* of the pin 399 passes through a slot 403 in the bottom plate 540, a spring 404 normally holding the pin in the rightmost end of the slot as seen in Fig. 15. The pawl 398 is mounted on pin 399 and is guided between bracket 401 and an enlarged portion 399*a* of pin 399 to allow in and out movement of pawl 398 relative to the rack 153 during the previously described shifting of the actuator carriage 120. The bottom depending portion 399*b* of the pivot pin 399 is moved to the left of the slot 403 and is locked in this position during rotation of the hand crank, as described hereinafter, and such movement of pivot pin 399 causes the top surface of the enlarged portion 399*a* to move the ear 154 downwardly and out of engagement with the rack 153. This occurs early in the hand crank cycle before numeral wheel actuation is completed, but the centralized pawl 408, mentioned above, prevents the return of the actuator carriage at this time.

Early in the cycle of rotation of the hand crank the centralizer pawl 408 (Figs. 16 and 17) is moved, by means described hereinafter, into engagement between respective teeth of a rack 409 on the actuator carriage bottom plate 120*a*, and holds the actuator carriage 120 in its shifted position until near the end of the cycle. The escapement pawl 398 (Fig. 16) therefore may be disengaged from the rack 153 any time after the centralizer pawl 408 is engaged with rack 409. In this manner the machine is conditioned to permit the spring mechanism 134 (Fig. 16) to return the actuator carriage to its leftmost position when the centralizer pawl 408 is withdrawn from engagement with rack 409.

From the foregoing description it is seen that the shifting of the actuator carriage to a position of decimal alignment with the accumulator register is under the control of the decimal key and the respectively set positions of the decimal indicators 126 and 124, and that the return of the carriage to its initial position is under the control of the hand crank.

*Main drive mechanism*

The main drive mechanism comprises the hand crank 155 (Fig. 12), the shaft 302 to which the crank is fixed, and respective gear drives from shaft 302 to shafts 274, 304, 420 and 421.

Shaft 304 is rotatably supported by the left and right side frames of the machine and carries the tens carry actuating mechanism for the accumulator register as previously mentioned. Shafts 420 and 421 carry the digital actuator and the tens carry actuator drums respectively, for a counter register (not shown). Since the present invention is neither concerned with the digital actuator for the counter register nor with the tens carry actuators for the accumulator and counter registers, further mention of the same is believed unnecessary.

The rotation of shaft 304 in either direction by the hand crank rotates a cam 515 (Fig. 17) and causes a follower 517 to rock a transverse shaft 303 and a plurality of ordinal lock pawls 288 (Fig. 6) counterclockwise. The pawls engage the peripheral teeth 172*a* and lock the selection plates 172 in their selectively set positions to prevent the rotation of the plates during numeral wheel actuation. The lock pawls 288 are returned to their initial clockwise positions slightly before the selection plates are restored to their initial clockwise positions by mechanism described hereinafter.

Referring now to shaft 274 and associated mechanisms, the shaft is driven by the hand crank 155 (Fig. 12) through gears 301 and 300. Shaft 274 carries the ordinal actuators for the accumulator register, as previously described and each complete rotation of the hand crank in either direction causes a single cycle of additive or subtractive actuation of the numeral wheels.

Shaft 274 also carries a cam 159 (Fig. 17) which returns the shift lever 150 (Fig. 16) from any shifted position thereof to its initial leftmost position. A follower lever 161 (Fig. 17), freely pivoted at 436 to the machine frame work, carries a roller 160 for contact with the periphery of cam 159 and is urged counterclockwise by a spring 438 to hold the roller 437 against the cam. The follower lever 435 carries a stud 439 which is adapted to cooperate with the upper end of a lever 440 forming a portion of the restore mechanism for the shift lever. Lever 440 may stand in either the initial full line position shown, or in the dotted line position 440*a*, or in some intermediate position depending on the shifted position of the actuator carriage as will be made clear hereinafter.

Figure 17:
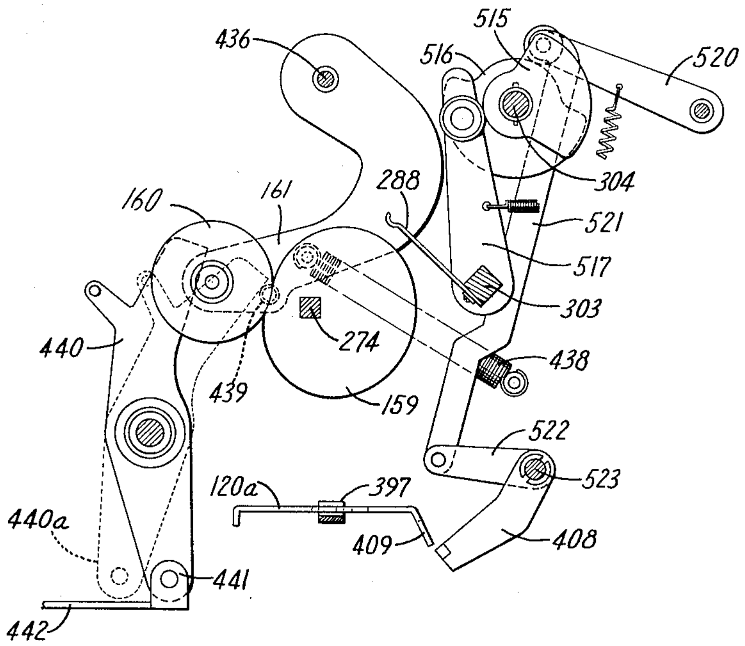
Fig. 17 is a right side view showing respective control cams and associated mechanisms for locking the actuator carriage in any ordinally shifted position and for recocking the right shift mechanism for said carriage.

When shaft 274 is rotated in either a clockwise or counterclockwise direction during negative or positive actuation, respectively, the cam 159 moves the follower 161 clockwise and the pin 439 restores lever 440 to the full line position shown. The lower extremity of lever 440 is connected to an upstanding ear 441 on a link 442 (Fig. 16). The other end of link 442 is connected to an arm 443 of the previously mentioned bell crank 382. The counterclockwise movement of lever 440 (Fig. 17)

is therefore effective through link 442 (Fig. 16) to restore the bell crank 382 to the initial position shown in Fig. 16. The bell crank 382, in turn, is effective through link 380 to restore the shift lever 150 to its initial leftmost positions whereupon the latch 149 re-engages ear 371 and locks the shift lever 150 in its initial position. At such time spring 152 is tensioned and remains in this condition until the decimal key is depressed.

Figure 13:
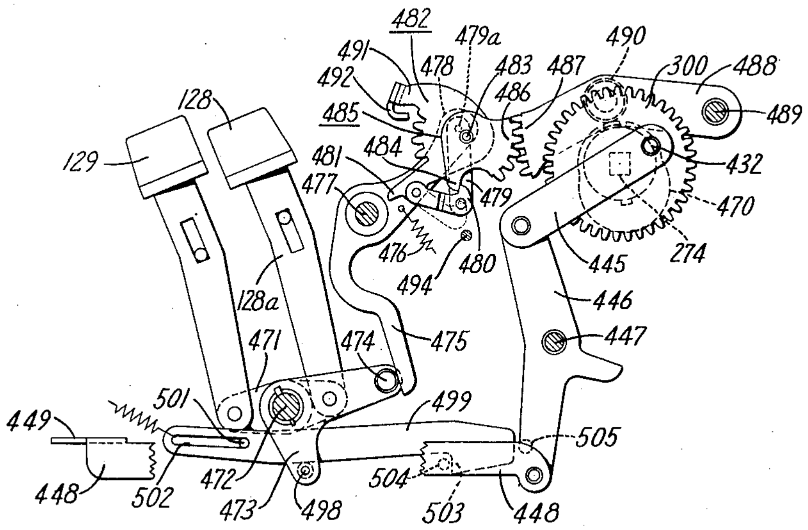
Fig. 13 is a right side view of the plus-minus key and associated mechanisms which condition the machine for adding and subtracting operations.

The rotation of the hand crank also restores the value entry device 136 (Fig. 16) to its initial leftmost position relative to the actuator carriage rack 242. For this purpose the previously mentioned gear 300 (Figs. 12 and 13) which is fixed to shaft 274, carries a crank pin 432 (Fig. 13) and the upper end of a link 445 is freely mounted on the crank pin. The lower end of link 445 is pivotally mounted on the upper end of a bell crank 446 pivoted on a stud 447. The lower end of bell crank 446 is connected to a link 448 and the opposite end of the link has an ear 449 (Figs. 13 and 16). A lever 450 (Fig. 16) is pivotally connected to ear 449 and is freely mounted on a stud 451 carried by the bottom frame plate. The crank pin 432 (Fig. 13) is therefore effective through the above linkage to rock the lever 450 (Fig. 16) clockwise and this rocking movement is transmitted through mechanism now described to a restore lever 138 for the entry device 136.

Lever 450 has an aperture 452 which embraces a pin 453 fixed to the bottom of a gear segment 454. The latter is freely mounted on a stud 455 and has gear teeth 456 meshed with a second gear segment 457. Gear segment 457 is freely mounted on stud 247 and has an upstanding ear 457*a* which normally lies adjacent the ear 251 of the previously mentioned lever 138. A torsion spring 248 urges segment 457 clockwise against the ear 251 so that segment 457 and lever 138 normally act as an integral unit. It will be recalled that during the entry of values into the actuator, the lever 138 and spring 246 urge the value entry device 136 (Fig. 16) to the right and that the carriage is escaped one order toward the right for each ordinal entry made into the actuating mechanism. At the end of such entry the lever 138 therefore stands in a clockwise position such as that shown in Fig. 16, and through the urgency of the torsion spring 248, the segment 457 rotates clockwise with lever 138. The clockwise movement of segment 457, in turn, causes counterclockwise movement of segment 454 and moves the pin 453 counterclockwise a limited amount within the aperture 452.

In Fig. 16, the entry device 136 is shown in its rightmost escaped position relative to the actuator escapement rack 135, and in which position the pin 453 lies in the middle of aperture 452. When the decimal key is depressed and the actuator carriage 120 is shifted toward the right, as previously described, the entry device 136 is shifted further toward the right with the actuator carriage. Such rightward movement of the device 136 causes additional clockwise movement both of lever 138 and the segment 457 and therefore moves segment 454 and pin 453 further counterclockwise from the position shown in Fig. 16.

With the pin 453 lying in any position within the aperture 452, the rotation of crank pin 432 (Fig. 13) and the counterclockwise movement of lever 450 (Fig. 16) causes the lower end 452*a* of slot 452 to contact the pin 453 and move the pin and the gear segment 454 clockwise. The other segment 457 is therefore rotated counterclockwise, thus tensioning the spring 248 and causing lever 138 to be rocked counterclockwise against the tension of spring 246. This returns the entry device 136 to its initial leftmost position relative to the actuator rack 135. If this position is reached before the lever 450 is moved the full extent provided, then the torsion spring 248 merely yields to permit such movement. In the foregoing description it will be noted that the crank pin 432 (Fig. 13) and associated linkage is the equivalent of the cam 156, schematically shown in Fig. 18.

During the above described return movement of the entry device 136 the spring urged escapement finger 143 (Fig. 6) yields upwardly over the teeth 242 of rack 135. Since the return leftward movement of the entry device 136 also carries the selection finger 139 to the left, means are provided to move the finger 139 to a position (to the left as seen in Fig. 6) in which the stop pin 165 is clear of the value setting arms 166 which are set in various clockwise from "0" to "9."

Figure 14:
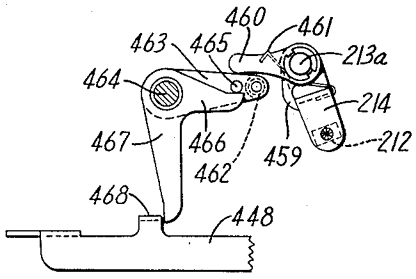
Fig. 14 is a right side view of a portion of the mechanism shown in Fig. 13.

This movement of the selection finger 139 is obtained by moving the support rail 212 to the left as viewed in Fig. 6. The rail 212 is supported by a pair of arms 213 and 214 (Figs. 3 and 14) fixed to shaft 213*a* as previously mentioned. A lever 459 (Fig. 14) lies adjacent the arm 214 and is freely mounted on shaft 213*a*. A lever 460 is integral with lever 459 and a torsion spring 461 overlies the lever 460 and arm 214 to hold lever 459 against arm 214. Arm 214 and levers 459 and 460 thus act as an integral unit. The leftward end of the lever 460 lies in the plane of a roller 462 fixed on a lever 463 freely mounted on a shaft 464 and carrying a stud 465 which overlies an extension 466 of a bell crank 467 freely mounted on shaft 464. A lower depending portion of bell crank 467 lies adjacent an ear 468 on the previously mentioned link 448 (Fig. 13). The latter is moved toward the right when the hand crank is rotated in either direction, as previously mentioned, at which time ear 468 (Fig. 14) moves bell crank 467 counterclockwise. Such movement causes the extension 466 to move stud 465 and lever 463 counterclockwise and through roller 462 to move lever 460 clockwise. This tensions the spring 461 and causes arm 214 to follow lever 460 in its clockwise movement. In this manner arm 214 moves the rail 212 (Fig. 6) clockwise, thus moving the selection finger 139 to the left out of the path of the adjustment arms 166 after which the entry device 136 is returned to its initial position. During the second half of the hand crank cycle, the link 448 (Fig. 13) is returned to its initial position and the rail 212 is returned to the initial position shown in Fig. 6.

A cam 470 (Fig. 13) is also fixed to shaft 274 and is provided to reset the ordinal actuators and the indicator numeral wheels 121 to their initial "blank" positions shown in Fig. 6. This is accomplished by moving a transverse bail 492 (Fig. 6) downward in such a manner as to contact and return the extensions 283*a* to the initial position shown. At such time, each member 283 with its gear segment 282 is rotated counterclockwise, and through the gear 281 which is integral with the selector plate 172, rotates the latter to its initial "blank" position. At the same time, the gear segment 284 on each member 283 rotates its gear 285 and the respective indicator dial 121 to its initial "blank" position.

The resetting of the selection plates 172 and the indicator dials 121, however, is dependent upon whether or not the plus-minus key 128 (Fig. 13) is in depressed position. With a key 128 in depressed position a connection is established by means of which the cam 470 is enabled to reset the actuators to initial positions. When key 128 is depressed, as is assumed in the present case, the key stem 128*a* rocks a lever 471 clockwise to the position shown in Fig. 13. Lever 471 is fixed to a transverse shaft 472 upon which is fixed a bellcrank 473. A roller 474 is carried by the rightmost arm of the bellcrank 473 and, in the position shown, the roller holds a lever 475 in a counterclockwise position against the tension of a spring 476. Lever 475 is freely mounted on a shaft 477 and the upper extremity 478 of lever 475 has a depending link 479 pivotally mounted thereon at 479*a*. The lower end of link 479 pivotally supports one end of a hook pawl 480 and the opposite end of the pawl is similarly supported by the lower extremity 481 of a member 482. The latter is freely mounted on a stud 483 carried by the right side frame, and upon which stud is also freely mounted a member 485. With the parts in the positions shown, the hook pawl 480 lies adjacent a finger 484 on member 485 so that upon counterclockwise movement of member 485 the finger 484 picks up and rocks the hook pawl 480 together with member 482 and the transverse bail 492. The counterclockwise movement of member 485 is obtained as follows. Member 485 has a gear segment 486 which meshes with a gear segment 487 formed on the left end of a follower lever 488. Lever 488 is freely mounted on a shaft 489 and carries a roller 490 which rides on the periphery of cam 470. Rotation of cam 470 in either direction therefore rocks the follower lever 487 clockwise, and through the gears 487—486, rotates member 485 and a member 482 counterclockwise.

At such time bail 492 rocks extensions 283*a* (Fig. 6) and members 283 to their initial "blank" positions to cause the resetting operation of the ordinal actuators in the manner described above. The selector plates 172 are then locked in their "blank" positions by the selection arms 166 which are moved counterclockwise to their initial positions shown after the resetting of the selection plates. This is accomplished by means of a transverse bail 495_a_ which is rocked counterclockwise in timed relationship to the restoration of the selector plates 172, and which bail engages the ears 496 of the arms 166 and returns them to the initial position shown. At such time the lock pawls 168 engage the teeth 174 of the arms 166 and hold them in the position shown. The ear 287 is thus positioned in front of step 289 and locks the selector plates in "blank" position.

The mechanism for moving the bail 495_a_ counterclockwise includes the finger 481 (Fig. 13) on the previously described member 482 and which finger, upon counterclockwise movement thereof, engages a pin 494 (Figs. 13 and 6) projecting from an arm 495 supporting the bail 495_a_, thus causing the bail 495_a_ to be rocked counterclockwise. From the foregoing description it is evident that rotation of the handcrank resets the selection plates 172 and the indicator dials 121 in their respective blank positions in which they are locked until a subsequent value is entered into the numeral wheel actuators.

It will be noted that the above described resetting of the indicator numeral wheels 121 to their initial "blank" indicating positions also restores the exposed decimal indicator 124 from the decimal indicating position shown in Fig. 9 to its initial hidden position shown in Fig. 7. When an associated indicator numeral wheel 121 is rotated clockwise to its "blank" position, the arm 323 integral therewith is also rotated clockwise. Arm 323 has an ear 323_a_ which, during clockwise movement of the arm contacts an ear 330_a_ on the decimal carrier and restores the same to the initial position shown in Fig. 7. At the same time, ear 324 on arm 323 contacts the tail 325 of the stop member 147 and rocks the same counterclockwise from the position shown in Fig. 9 to that shown in Fig. 7. Meanwhile the actuator carriage is returned to its leftmost position away from the stop lug 148 (Fig. 9) thus permitting the slide 339 to be moved to the right under the urgency of the torsion spring 327. This permits the latch 332 for the decimal carrier 330 to return to its initial clockwise position and lock the decimal carrier 330 in its initial position.

During problems of addition and subtraction the actuator carriage, as previously mentioned, is returned to its initial leftmost position during the latter part of each cycle of operation of the handcrank. For this purpose the handcrank and related mechanisms are effective first, to remove the pawl tooth 154 (Fig. 16) from engagement with the actuator carriage rack 153 and then to remove the centralizer pawl 408 from engagement with rack 409. This releases the actuator carriage to the control of the spring mechanism 134 which then effects the return shifting operation.

The mechanism for withdrawing the tooth 154 from rack 153 includes the previously mentioned link 448 (Fig. 13) which is moved to the right and back by the crank pin 432. Link 448 carries a pin 504 lying adjacent a hook 503 formed on a member 499. The latter is slidably mounted on a pin 501 and is further supported by a roller 498 carried by the previously described lever 473. With the lever 473 set in the position shown by the depression of the plus-minus key 128, the roller 498 holds the slide 499 in the position shown so that the rightmost end of the slide lies adjacent a pin 505 (Fig. 15) projecting from a second slide 506. In this manner the link 448 (Fig. 13), the hook slide 499 and the slide 506 (Fig. 15) are connected together and act as an integral unit. Slide 506 has a horizontally formed portion lying flat on the bottom frame plate and guided by a pin 540_a_ projecting from the plate. Slide 506 carries a pin 507 which projects through a slot 508 in a bellcrank 406 pivotally mounted at 406_a_ to the bottom frame plate and having an arm 405 lying adjacent the previously described pin 399. It is evident, therefore, that the rightward movement of link 448 (Fig. 13) together with the slides 499 and 506 causes the bellcrank 406 (Fig. 15) to rock counterclockwise thus moving the pin 399 clockwise. This causes clockwise movement of pawl 398 and removes tooth 154 from restraining engagement with rack 153.

The pawl 398 must be held disabled in its clockwise position until after the centralizer pawl 408 (Fig. 16) is removed from rack 409 to release the actuator carriage for its return movement, and the following mechanism is provided to lock the pawl 398 in its clockwise position until after such return carriage movement is completed.

A latch lever 509 (Fig. 15) is pivotally mounted at 510 on the bottom frame plate of the machine and is urged counterclockwise by a spring 511. A latching notch 512 on the leftmost end of the lever normally lies to the left of the pin 399 but upon clockwise movement of the pin to withdraw the pawl tooth 154 from rack 153, the pin 399 moves past the notch 512 whereupon the latch lever 509 moves counterclockwise into restraining engagement with the pin. This condition prevails until the actuator carriage is returned to its initial position (to the right in Fig. 15) whereupon a pin 514, projecting beneath the carriage bottom plate 120_a_ wipes along a cam face 513 on the latch lever 509 and moves it clockwise, thus releasing the pin 399 and permitting the tooth 154 to reengage rack 153 with the actuator carriage in its initial position.

The mechanism for controlling the previously mentioned centralizer pawl 408 includes a cam 516 (Fig. 17) carried by shaft 304. Early in the operating cycle of the machine the cam 516 acts through a follower 520 and a link 521 to rock an arm 522 and the shaft 523 clockwise. The centralizer pawl 408 is fixed to shaft 523 and is adapted, upon clockwise movement of shaft 523 to rock upwardly into engagement with the teeth of the centralizing rack 409 (Fig. 16). At such time the pawl 408 locks the carriage in a respective ordinal position and holds it in this position until near the end of the handcrank cycle when it is withdrawn from the rack. It should be noted that the pawl 408 is rocked to locking position before the shift lever 150 is restored to the initial position shown in Fig. 16 and also before the pawl tooth 154 is withdrawn from engagement with rack 396. The withdrawal of pawl 408 (Fig. 16) from rack 409 is the last function performed by the rotation of the handcrank and permits restoration of the actuator carriage to its initial position by the spring mechanism 134.

In review then, the rotation of the handcrank causes the following operations which are listed below in only approximate timed sequence since some of the operations overlap each other:

(1) Cam 516 (Fig. 17) rocks the centralizer pawl 408 clockwise to lock the actuator carriage in its current shifted position of decimal alignment with the accumulator register.

(2) Cam 515 rocks the pawls 288 (Figs. 6 and 17) counterclockwise to lock the selector plates 172 in their selectively set positions.

(3) Shaft 274 (Fig. 5) and the actuator segments 265 are rotated to advance the numeral wheels of the accumulator register by selected amounts.

(4) Crank pin 432 (Fig. 13) acts through link 445, bellcrank 446, link 448 (Fig. 16), lever 450, pin 453 and gear segments 456 and 457 to move the shift lever 138 counterclockwise and thus restore the value entry device 136 to its initial leftmost position with respect to the actuator carriage rack 135.

(5) Cam 159 (Fig. 17) acts through follower 161, lever 440 (Fig. 16), link 442, bellcrank 382 and link 380 to return the shift lever 150 to its initial leftmost position where it is locked by latch 149.

(6) Crank pin 432 (Fig. 13) acts through link 445, bellcrank 446, link 448, pin 504, link 499, pin 505 (Fig. 15), slide 506, pin 507, and bellcrank 406 to rock the lower portion of pin 399 clockwise and thus withdraw pawl tooth 154 from engagement with rack 153 and in which withdrawn position the pawl is locked by latch lever 509.

(7) Cam 515 (Fig. 17) permits the pawls 288 (Fig. 6) to return to their initial clockwise positions out of engagement with the selector plates 172.

(8) Cam 470 (Fig. 13) causes follower 488, gear segments 487 and 486, hook pawl 480, member 482, and bail 492 (Fig. 6), to rock each member 283 counterclockwise to its initial position and thus:

(_a_) Restore the indicator numeral wheels 121 to initial "blank" positions.

(_b_) Restore the exposed decimal indicator 124 (Fig. 7) to its initial hidden position.

(_c_) Return the selector plates 172 (Fig. 6) to their initial "blank" positions where they are locked by the selection arms 166.

(9) Cam 516 (Fig. 17) permits the centralizer pawl 408 to return to the initial position shown and thus release the actuator carriage whereupon the spring mechanism 134 (Fig. 16) returns the actuator carriage 120 to its initial leftmost position.

(10) The return of the actuator carriage per (9) above causes pin 514 (Fig. 15) on the actuator carriage bottom plate 120*a* to rock latch 509 clockwise and thus release the pin 399 whereupon the pawl tooth 154 re-engages rack 153.

At this time the entire machine is restored to its initial condition with the exception that the accumulator register shows the value entered therein and the counter register shows the item count. The next value to be accumulated may then be entered into the machine by depression of the ten entry keys and the decimal key, as previously described, after which the handcrank is rotated once to advance the numeral wheels of the accumulator register in accordance with the value selected and to restore the machine to a condition in which another value may be entered.

I claim:

1. In a calculating machine having a register fixed in the frame of the machine, a shiftable decimal indicator for said register, and means for locking the decimal indicator in a selected position relative to said register, a shiftable carriage, and carriage shifting mechanism therefor, a register actuator mounted on said carriage for shifting movement relative to said register, a factor receiving device also mounted on said carriage and effective to control the operation of the actuator; the combination of, factor decimal means for indicating the position of the decimal point in the factor entered into said receiving device, a ten key keyboard including, numeral keys for entering numeral values into said receiving device, and a decimal key, means responsive to depression of the decimal key to render the factor decimal means effective to indicate the position of the factor decimal point, and means also responsive to depression of the decimal key to initiate operation of the carriage shifting mechanism, with shift terminating mechanism controlled jointly by the locked result decimal and the effective factor decimal means to stop the carriage shifting operation.

2. In a calculating machine having a plural order register fixed in the frame of the machine, a shiftable decimal indicator for said register, and means for locking the decimal indicator in a selected position, a shiftable carriage, and carriage shifting mechanism therefor, a register actuator mounted on said carriage for shifting movement relative to said register, a plural order factor receiving device also mounted on said carriage and effective to control the operation of the actuator; the combination of, a ten key keyboard including, numeral keys for entering numeral values into said receiving device, and a decimal key, a plurality of factor decimal indicators, means responsive to depression of the decimal key to render one of said factor decimal indicators effective to display the position of the decimal point in the factor entered into the receiving device, and means also responsive to depression of the decimal key to initiate operation of the carriage shifting mechanism, with shift terminating mechanism controlled jointly by the locked result decimal indicator and the effective factor decimal indicator to stop the carriage shifting operation.

3. In a calculating machine having a ten key keyboard, a selectively adjustable factor receiving device and factor decimal indicating means therefor, a result register and a result decimal indicator manually shiftable relative thereto; the combination of, a shiftable setting element operable to control the adjustment of said receiving device, mechanism for shifting said element transversely relative to said receiving device, means responsive to depression of the numeral keys of said keyboard to control the adjusting operation of said element, and means also responsive to depression of said numeral keys to control said element shifting mechanism, with a transversely shiftable carriage for said receiving device and said factor decimal indicating means, and shifting mechanism for said carriage, a decimal key, decimal setting means responsive to depression of said keys for rendering said factor decimal indicating means effective to display the position of the decimal point in the factor entered into said receiving device, means also responsive to depression of the decimal key to cause the shifting mechanism to shift the carriage, and means controlled jointly by the effective factor decimal indicating means and said result decimal indicator to stop the operation of the carriage shifting mechanism.

4. In a calculating machine having a ten key keyboard, a selectively adjustable plural order factor receiving device, and a plurality of factor decimal indicators therefor, a result register, and a result decimal indicator manually shiftable to a position for indicating the decimal point in said register; the combination of, a shiftable setting element operable to control the adjustment of successive orders of said receiving device, mechanism for shifting said element transversely relative to said receiving device to enable such adjustment of the latter, means responsive to depression of the numeral keys of said keyboard to control the adjusting operation of said element, and means also responsive to depression of said numeral keys to control said element shifting mechanism, with a carriage for said receiving device and said factor decimal indicators, and shifting mechanism for said carriage, a decimal key, decimal setting means responsive to depression of said key for rendering one of said factor decimal indicators effective to display the position of the decimal point in the factor entered into said receiving device, means also responsive to depression of the decimal key to cause the shifting mechanism to shift the carriage, and means controlled jointly by said effective factor decimal indicator and said result decimal indicator to stop the operation of the carriage shifting mechanism.

5. In a calculating machine having a ten key keyboard, multiorder devices selectively settable to represent a multidigit numeral value, and mechanism for setting said devices including, a setting element shiftable into operative relation to successive ones of said devices, and means responsive to depression of any of the keys of the keyboard to control the element to set the one of said devices with which it is operatively related and to cause said element to shift into operative relation with the next adjacent device; the combination of, factor numeral wheels to display the multidigit numeral value set in said devices, normally disabled ordinal decimal indicators, one interposed between each numeral wheel, a decimal key on said keyboard, means controlled by depression of said decimal key to enable the decimal indicator adjacent the numeral wheel which displays the last digit entered into the machine by the numeral keys, with a result register, a result decimal indicator movable to a selected ordinal position relative to the register, a carriage for the selectively settable devices, means for holding said carriage stationary during the setting of said devices by the setting element, shifting mechanism for said carriage, means responsive to depression of said decimal key for disabling said holding means and for enabling the shifting mechanism to move the carriage relative to said result register, and means controlled jointly by said factor and result decimal indicators to stop the shifting movement of the carriage in a position in which said enabled factor decimal indicator and said result decimal indicator are in alignment.

6. In a calculating machine having a plural order register, decimal means operable to establish a representation of the decimal point in said register, a plurality of ordinally arranged differential actuators, each ordinal actuator being selectively settable to correspond to the value of the digit set therein and operable to enter said digital value into respective orders of said register; the combination of, value entering mechanism including numeral keys and a setting element controlled by said keys for selectively setting successive orders of said actuators, element stepping means also controlled by said keys for moving said element step by step into operative relation with successive actuator orders, a decimal key and factor decimal means controlled by the decimal key for representing the position of the decimal point of the factor set in said actuators, shifting mechanism for causing relative shitfing movement between said actuators and said register, means controlled jointly by said decimal key, said register decimal means and said factor decimal means for controlling the shifting mechanism to bring the actuators and register into decimal alignment, with means for maintaining the operative relationship between the setting element and said actuators during the aligning operation of said shifting mechanism.

7. In a calculating machine having a plural order register fixed in the frame of the machine, register decimal means operable to establish a representation of the decimal point of the numeral value which is to be entered into said register, a plurality of ordinally arranged differential actuators selectively settable to correspond to the value of the digits set therein and operable to enter said digital value into related orders of said register; the combination of, value entering mechanism including numeral keys and a shiftable setting element controlled by said keys for selectively setting successive orders of said actuators, element stepping means also controlled by said keys for moving said element step by step into operative relation with successive actuator orders, a decimal key and factor decimal means controlled by the decimal key for representing the position of the decimal point of the factor set in said actuators, a carriage in which said actuators are mounted for shifting movement with said carriage, means controlled jointly by said decimal key, said register decimal means and said factor decimal means for controlling the carriage shifting movement to bring the actuators and register into decimal alignment, with means for coupling the setting element to the carriage to cause the element to move with the carriage during the shifting movement of the latter.

8. In a calculating machine having a plural order register fixed in the frame of the machine, decimal indicating means operable to establish a representation of the decimal point of the numeral value which is to be entered into said register, a plurality of ordinally arranged differential actuators, each ordinal actuator being selectively settable to correspond to the value of the digit set therein and operable to enter said digital value into a respective order of said register; the combination of, value entering mechanism including numeral keys and a setting element controlled by said keys for selectively setting successive orders of said actuators, element stepping means also controlled by said keys for moving said element step by step into operative relation with successive actuator orders, a decimal key, and factor decimal means controlled by the decimal key for representing the position of the decimal point of the value set in said actuators, a carriage in which said actuators are mounted for shifting movement with said carriage, carriage shifting mechanism for moving the actuators transversely relative to said register, means also controlled by said decimal key for initiating operation of the carriage shifting mechanism, and aligning mechanism controlled jointly by the register decimal means and the factor decimal means for terminating the shifting operation, with means for coupling the setting element to the carriage to cause the element to move with the carriage during its shifting movement, said numeral keys being operable with the element in the position to which it was shifted with the carriage to control further setting and stepping operations of the element for setting in successive ordinal actuators the digits of a decimal fraction.

9. In a calculating machine having a frame, a register fixed to said frame, a decimal indicator selectively adjustable to represent the position of the decimal point in said register, differential actuators operable to enter a selected numeral value into said register, and numeral keys for setting a selected numeral value in said actuators; the combination of, a decimal means for representing the position of the decimal point in the value set in said actuators, a decimal key, means responsive to depression of the decimal key to control said decimal means, a shiftable carriage in which said actuators are mounted for shifting movement relative to said register, with spring means for shifting said carriage in either of two opposite directions including, a first spring for urging the carriage toward the left, and a second spring capable of overcoming said first spring and shifting said carriage toward the right, means responsive to the depression of said decimal key to release said second spring, decimal aligning mechanism controlled jointly by the register decimal indicator and said decimal means to stop the carriage in a position of decimal alignment, drive mechanism for said actuator, a member driven by said drive mechanism for restoring the power in said second spring, means for retaining the carriage in said position against the power of said first spring during such power restoration, and a second member also driven by said drive means for releasing said first spring from restraint of said retaining means.

10. In a calculating machine having a plural order register, ordinally arranged actuators therefor, and actuator drive means, value entering mechanism including numeral keys and a setting element controlled by said keys for setting successive orders of said actuators, element stepping means controlled by said key for moving said element step by step from an initial position to successive actuator setting positions, and a carriage in which said actuators are mounted for shifting movement relative to said register; the combination of, means for shifting the carriage in either of two opposite directions including a first spring for urging said carriage in one direction, and a second spring capable of overcoming said first spring and shifting the carriage in the opposite direction, a decimal means for releasing said second spring and arresting the shifting operation of said carriage upon movement thereof to a selected position determined by said decimal means, and means for coupling the setting element to the carriage to cause the element to move with the carriage during the shifting movement of the latter, with restoring means including a member driven by said actuator drive means for restoring the power in said second spring, means for retaining the carriage in said selected position during such power restoration, a second member driven by said actuator drive means for releasing said retaining means to enable the first spring to cause return shifting movement of the carriage, and a third member driven by the actuator drive means to return the setting element to its initial position relative to the actuators concurrently with the return shifing movement of said carriage.

11. In a calculating machine having a plural order register, ordinally arranged actuators therefor, and actuator drive means, value entering mechanism including numeral keys and a setting element controlled by said keys for setting successive orders of said actuators, element stepping means controlled by said key for moving said element step by step from an initial position to successive actuator setting positions, and a carriage in which said actuators are mounted for shifting movement relative to said register; the combination of, means for shifting the carriage in either of two opposite directions including a first spring for urging said carriage in one direction, and a second spring capable of overcoming said first spring and shifting the carriage in the opposite direction, a decimal means for releasing said second spring and arresting the shifting operation of said carriage upon movement thereof to a selected position determined by said decimal means, and means for coupling the setting element to the carriage to cause the element to move with the carriage during the shifting movement of the latter, with restoring means including a member driven by said actuator drive means for restoring the power in said second spring, means for retaining the carriage in said selected position during such power restoration, a second member driven by said actuator drive means for releasing said retaining means to enable the first spring to cause return shifting movement of the carriage, a third member driven by the actuator drive means to return the setting element to its initial position relative to the actuators concurrently with the return shifting movement of said carriage, and a yieldable connection between said third member and the setting element to enable the latter to return to its initial position prior to completion of the return shifting movement of said carriage.

References Cited in the file of this patent

UNITED STATES PATENTS

| | | |
|---|---|---|
| 1,160,372 | Brown | Nov. 16, 1915 |
| 1,332,543 | Cluley | Mar. 2, 1920 |
| 2,088,049 | Britten | July 27, 1937 |
| 2,141,597 | Cunningham | Dec. 27, 1938 |
| 2,329,190 | Ellerbeck | Sept. 14, 1943 |
| 2,344,885 | Kozma | Mar. 21, 1944 |
| 2,467,419 | Avery | Apr. 9, 1949 |
| 2,492,345 | Allen | Dec. 27, 1949 |